(12) United States Patent
Piasecki et al.

(10) Patent No.: US 11,682,917 B1
(45) Date of Patent: Jun. 20, 2023

(54) APPARATUS, SYSTEM AND METHOD FOR A REMOVABLE AIRCRAFT BATTERY

(71) Applicant: Piasecki Aircraft Corporation, Essington, PA (US)

(72) Inventors: Frederick W. Piasecki, Haverford, PA (US); Robert H. Lewis, Wynnewood, PA (US); Luigi U. Ricci Moretti, Swarthmore, PA (US)

(73) Assignee: Piasecki Aircraft Corporation, Essington, PA (US)

( * ) Notice: Subject to any disclaimer, the term of this patent is extended or adjusted under 35 U.S.C. 154(b) by 0 days.

(21) Appl. No.: 17/315,083

(22) Filed: May 7, 2021

Related U.S. Application Data

(60) Provisional application No. 63/022,008, filed on May 8, 2020.

(51) Int. Cl.
*H02J 7/00* (2006.01)
*H01M 50/249* (2021.01)
(Continued)

(52) U.S. Cl.
CPC ............ *H02J 7/0063* (2013.01); *B60L 50/64* (2019.02); *B60L 53/60* (2019.02); *B60L 58/12* (2019.02); *B60L 58/24* (2019.02); *B64C 1/062* (2013.01); *B64C 1/10* (2013.01); *B64D 27/24* (2013.01); *H01M 10/46* (2013.01); *H01M 10/482* (2013.01); *H01M 10/613* (2015.04); *H01M 10/625* (2015.04); *H01M 10/6562* (2015.04); *H01M 50/249* (2021.01); *H02J 7/0013* (2013.01); *H02J 7/0047* (2013.01); *B60L 2200/10* (2013.01); *H01M 2220/20* (2013.01)

(58) Field of Classification Search
CPC ...... H02J 7/0063; H02J 7/0013; H02J 7/0047; B60L 50/64; B60L 53/60; B60L 58/12; B60L 58/24; B60L 2200/10; B64C 1/062; B64C 1/10; B64D 27/24; H01M 10/46; H01M 10/482; H01M 10/613; H01M 10/625; H01M 10/6562; H01M 50/249; H01M 2220/20
See application file for complete search history.

(56) References Cited

U.S. PATENT DOCUMENTS

2009/0176148 A1   7/2009  Jiang
2017/0244141 A1*  8/2017  Weicker ............. H01M 10/613
(Continued)

FOREIGN PATENT DOCUMENTS

WO   2020081266   4/2020
WO   2020081372   4/2020

*Primary Examiner* — Lincoln D Donovan
*Assistant Examiner* — Alex W Lam
(74) *Attorney, Agent, or Firm* — Robert J. Yarbrough

(57) ABSTRACT

A removable battery to provide motive power for an aircraft includes a battery frame and removable, interchangeable battery modules. Each of the battery modules defines module common space through which liquid heat transfer fluid flows during charging of the battery when the battery is removed from the aircraft and through which air as a heat transfer fluid flows during discharge of the battery, as during flight. The module common space also defines a combustion conduit to convey heated air and products of combustion safely outside the battery in the event of a cell fire during flight. The removable battery frame is a structural component of the aircraft.

20 Claims, 20 Drawing Sheets

Figure 1:
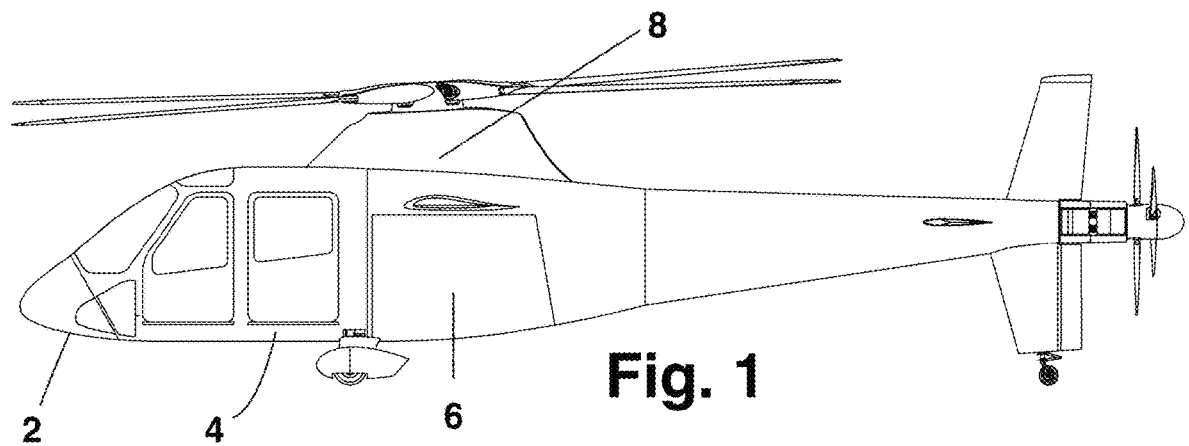

(51) Int. Cl.
    *H01M 10/6562*     (2014.01)
    *H01M 10/613*     (2014.01)
    *H01M 10/625*     (2014.01)
    *H01M 10/48*     (2006.01)
    *B64D 27/24*     (2006.01)
    *B60L 50/64*     (2019.01)
    *B60L 53/60*     (2019.01)
    *B60L 58/12*     (2019.01)
    *B60L 58/24*     (2019.01)
    *H01M 10/46*     (2006.01)
    *B64C 1/06*     (2006.01)
    *B64C 1/10*     (2006.01)

(56) References Cited

U.S. PATENT DOCUMENTS

2017/0338527 A1\*   11/2017   Walton ................ H01M 10/625
2020/0067157 A1     2/2020   Dunn
2020/0119416 A1\*   4/2020   Kim .................... H01M 10/613
2021/0078714 A1\*   3/2021   Demont .............. H01M 10/486

\* cited by examiner

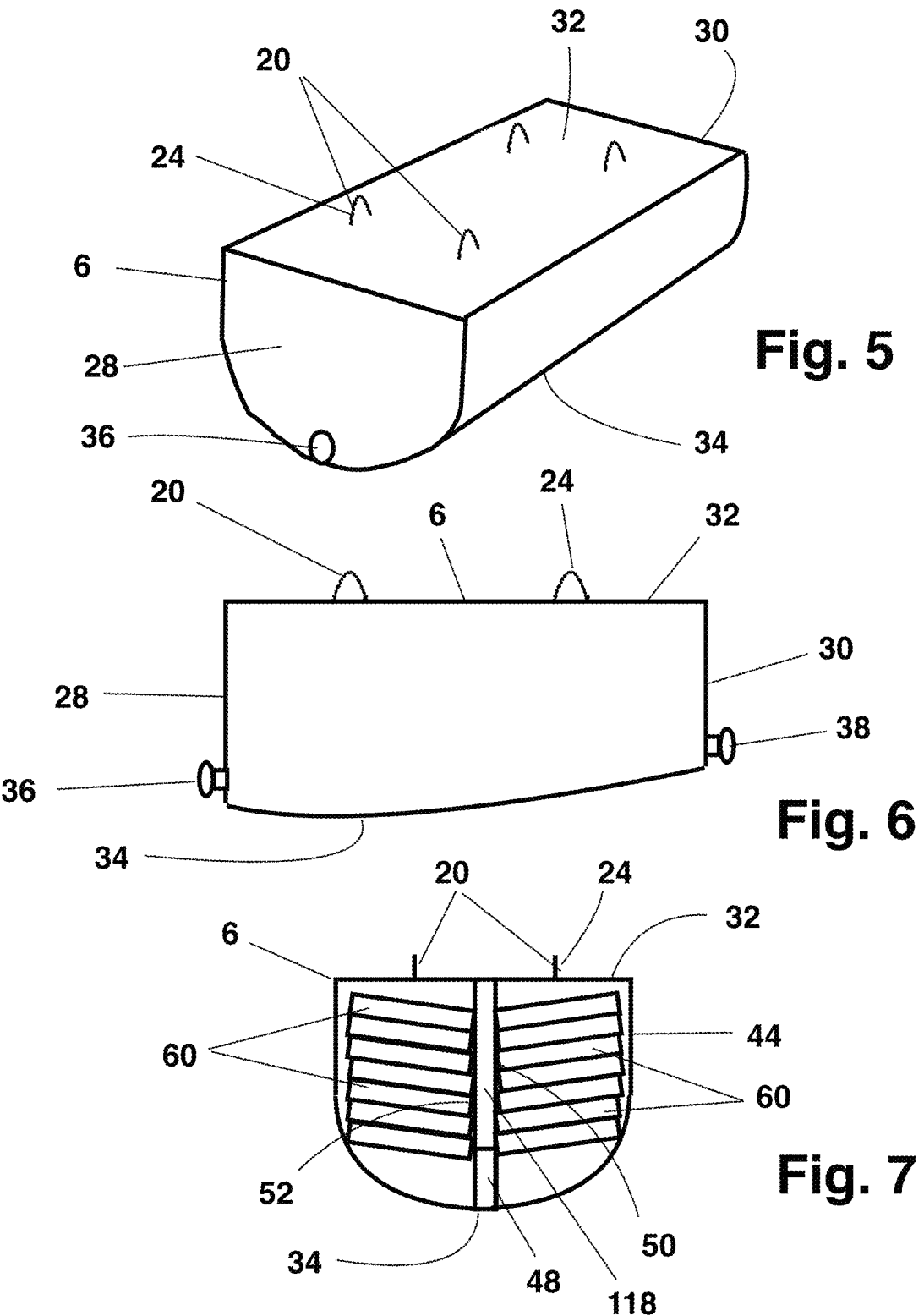

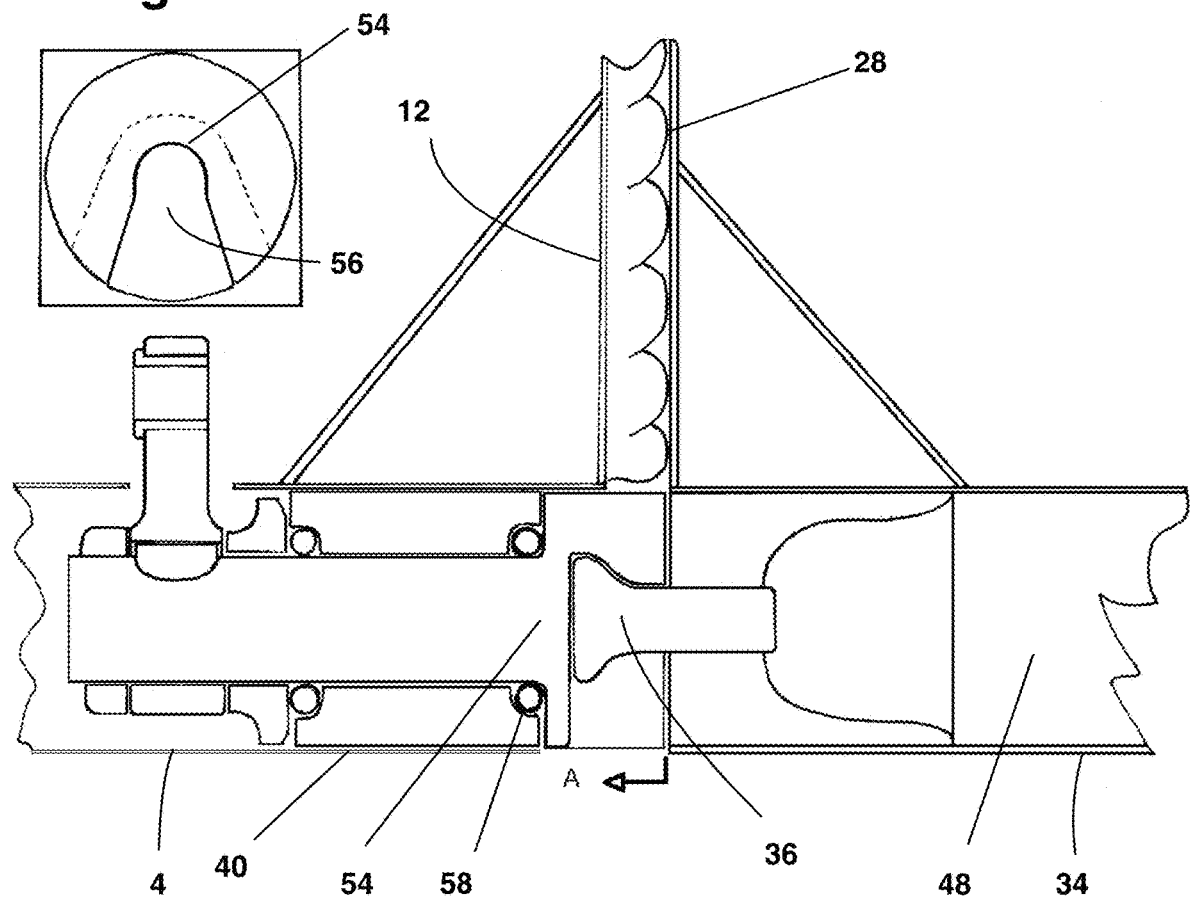

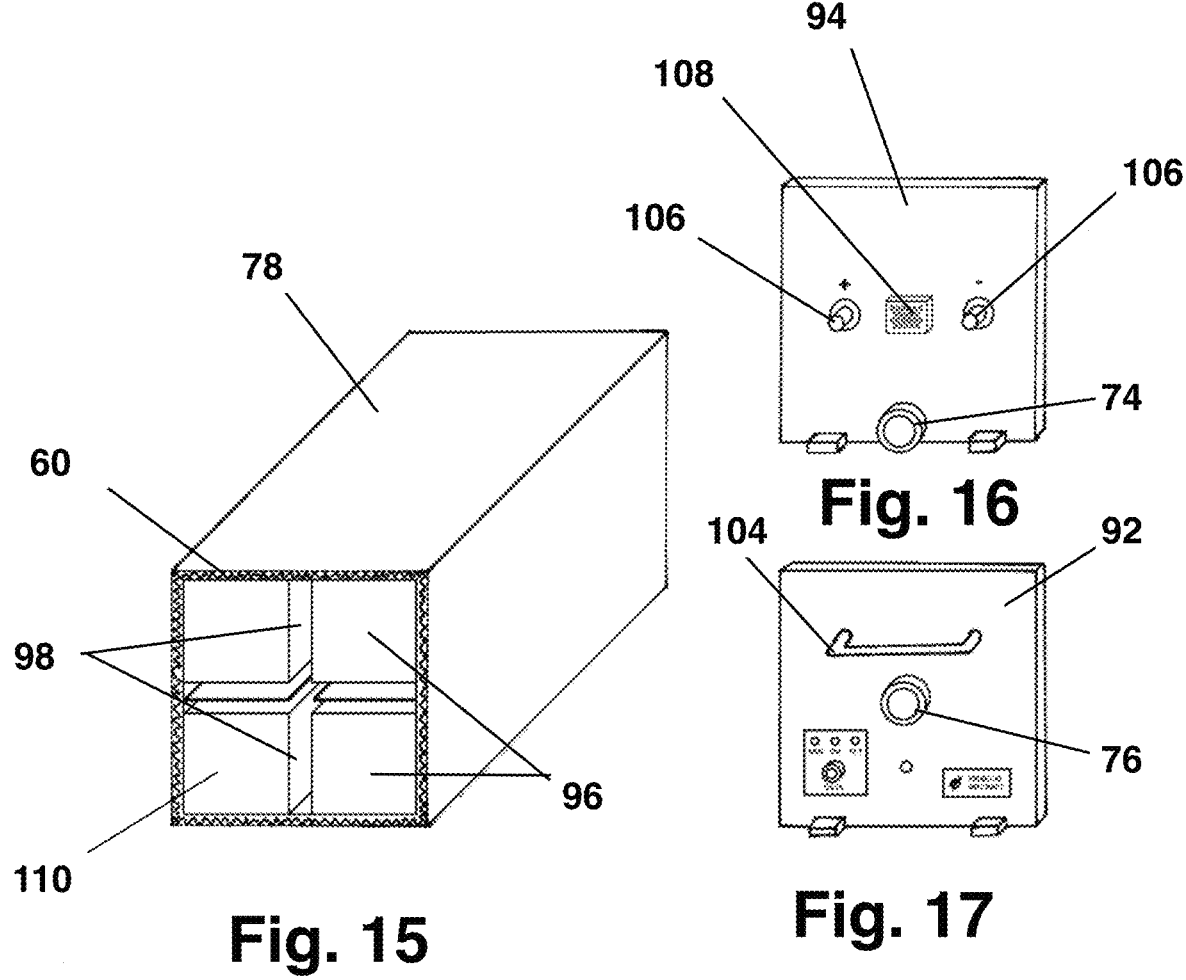

APPARATUS, SYSTEM AND METHOD FOR A REMOVABLE AIRCRAFT BATTERY

I. BACKGROUND OF INVENTION

A. Field of the Invention

The Invention is an apparatus, system and method for fixed or rotary wing aircraft where the aircraft propulsion system is powered in whole or in part by an electrical battery that may be removed from the aircraft for charging, maintenance or any other purpose. The Invention has application to any other battery-powered electrical system.

B. Description of the Related Art

The use of electrical batteries for aircraft propulsion suffers from disadvantages of weight and energy density compared to conventional liquid-fueled aircraft. Ongoing improvements in electric motors and in battery chemistry are overcoming these disadvantages; however, increases in energy density of batteries, particularly batteries based on lithium chemistry, create additional issues in the event of failure of a battery cell.

A cell of a lithium chemistry battery may fail due to an electrical short from dendrite growth, mechanical damage, cell overcharging, charging or discharging at too high a rate, or charging or discharging outside of design temperature ranges. A consequence of increased energy density is that a cell failure can result in a highly energetic and dangerous condition known as thermal runaway. In thermal runaway, the damaged cell overheats, catches fire and produces toxic combustion gases. The burning cell may cause its nearest neighbors to overheat, catch fire and produce more toxic combustion gases. Thermal failure of a single cell can cascade into an intense fire that it is extremely difficult to extinguish and that can destroy an aircraft.

The prior art does not teach the apparatus, system and method of the Invention.

II. SUMMARY OF THE INVENTION

A removable battery for aircraft propulsion is a modular and structural component of the aircraft. The battery is installed onto an aircraft for flight and removed from the aircraft for charging. The battery comprises a battery frame and multiple battery modules, described below, that are releasably attached to the battery frame. The battery frame provide structural support for the battery when the battery is removed from the aircraft so that the battery is self-supporting. The battery frame also provides structural support for the aircraft when the battery is installed on the aircraft. The aircraft with the battery installed meets flight and crash structural loads requirements, while the aircraft without the battery installed may not meet flight or crash structural load requirements.

The battery frame includes a ventral keel along the ventral side of the battery. The ventral keel is generally aligned with a vertical mathematical plane passing through the aircraft longitudinal axis when the battery is installed on the aircraft. A port bulkhead and a starboard bulkhead are attached to the keel and extend above the keel. The port and starboard bulkheads are generally planar and in a spaced-apart relation. The mathematical planes defined by the bulkheads are generally parallel to each other and parallel to the vertical mathematical plane when the battery is installed on the aircraft. The port and starboard bulkheads extend generally from the ventral keel toward the longitudinal axis of the aircraft and are disposed on the port and starboard sides, respectively, of the longitudinal axis when the battery is installed on the aircraft.

The aircraft fuselage defines an aircraft opening to receive the battery. The aircraft opening has an aircraft opening forward side, an aircraft opening aft side and an aircraft opening top side. The battery defines corresponding battery forward, aft and top sides. Any suitable attachment mechanisms may be used to secure the battery top side to the aircraft opening top side. The top side of the battery frame may, for example, feature rings or hooks configured to mate with corresponding rings or hooks supported by the aircraft opening top side. Any other mechanism capable of securely and releasably supporting the weight of the battery may be suitable, for example, threaded fasteners, pins, clamps, cables, chains and hoists.

The forward and aft sides of the battery frame at the ventral keel are configured to releasably attach to the corresponding locations on the aircraft opening forward and aft sides. Forward and aft structural connectors transmit force in both tension and compression from the aircraft opening forward side, through the ventral keel, port bulkhead and starboard bulkhead to the aircraft opening aft side. The structural connectors and the ventral keel are in a spaced-apart relation to the aircraft longitudinal axis so that the combination of the ventral keel and the port and starboard bulkheads resist flexural, or bending, forces applied to the aircraft along its longitudinal axis by flight or crash structural loads.

The forward and aft structural connectors may comprise mushroom-shaped connectors that are selectably trapped by a rotary lock. Alternately, the forward and aft structural connectors may comprise any mechanism that allows transmission of force in both tension and compression, such as pin connectors, dovetail connectors, T-shaped connectors, threaded fasteners, hooks, clamps, rods, chains or cables.

The ventral keel and bulkheads in combination are robust structural elements of the aircraft when the battery is installed on the aircraft and reinforce the aircraft fuselage in stiffness and resistance to flexure in the vertical mathematical plane coincident with the aircraft longitudinal axis.

Battery modules that are removable and interchangeable include feature to control the temperatures of the battery cells and to reduce the consequences to the battery and to the aircraft should thermal runaway of a battery cell occur. Within the battery, battery cells electrochemically store electrical power. Each of the battery cells may be of the pouch, prismatic or cylindrical types. Any other configuration of cell may be suitable. A plurality of battery cells, for example, 50 cells, is arranged and electrically connected to define a cell stack. The individual battery cells in the cell stack may be separated by barriers and supported by a cell frame. The barriers provide heat and electrical insulation between adjacent battery cells. The cell frame provides structural support for the battery cells in the cell stack. The cell frame is not fluid-tight and allows fluid, such as an electrically non-conducting, non-flammable liquid or gaseous heat transfer fluid, to move through the cell frame and to contact the battery cells to facilitate heat transfer between the battery cells and the heat transfer fluid. The module case, described below, may define the cell stack frames for that battery module.

A plurality of cell stacks, for example four cell stacks, may be contained within a battery module. Each battery module may be removed from or placed into the battery by a human user when the battery is attached to the aircraft.

Replacement, addition or removal of individual battery modules allows the human user to maintain the battery or to adjust the electrical capacity and weight of the battery to correspond to the needs of a particular aircraft mission.

Each battery module has a module case that encloses the cell stacks and that defines a module common space within the battery module. The module common space is the interior volume of the module case less the space occupied by the battery cells, cell stacks, power bus, battery management wiring, and other internal components of the battery module. The module common space of all of the battery modules in combination defines a battery common space. A liquid heat transfer fluid may flow through the battery common space during charging of the battery. A gaseous heat transfer fluid, such as air, may flow through the battery common space during discharging of the battery, as during flight. In the event of a cell fire during flight, each module common space may define a combustion conduit. Heated air, decomposition products and products of combustion may flow through the combustion conduit defined by the module common space and be discharged outside of the battery without damage to the remainder of the battery or to the aircraft.

Each battery module defines a module inner end, a module outer end, and a module longitudinal axis. The module inner end defines a module lowest point when the battery is charging off of the aircraft. An inlet port is disposed at the module lowest point and communicates to the module common space. A valve, such as a float valve, may control the flow of liquid heat transfer fluid through the inlet port. The battery module includes an exit port on the module outer end for flow of liquid heat transfer fluid or air heat transfer fluid out of the module common space. When the battery is being charged off of the aircraft, liquid heat transfer fluid flows through the inlet port, through the valve, through the common space and contacting each battery cell, and out the exit port.

When the battery is installed on the aircraft, each module common space is occupied by air acting as a heat transfer fluid rather than by liquid heat transfer fluid. The air flows from a manifold defined by the battery frame and into the inlet port on the inner end of each battery module, through the module common space, and out the exit port on the outer end of the battery module. The exit port communicates to the outside of the battery.

Each battery module includes battery management wiring and at least one power bus electrically connected to the cells of each cell stack. The power bus conveys power to or from the cells. The battery management wiring connects the cells to the charging or discharging battery management system to control charge, discharge, balancing, and temperature of the cells and to monitor cell condition and wear. Each battery module includes power bus connectors and battery management connectors that engage corresponding connectors on the battery frame when the battery module is installed in the battery frame.

A valve, such as a float valve, disposed within the module common space serves to protect the battery and the aircraft in the event of a cell fire during flight. If a cell overheats or ignites when the battery is installed on the aircraft, the flow of air from the manifold and through the module common space will carry the heated air and products of thermal decomposition or products of combustion through the exit port on the module outer end to the outside of the battery. The decomposing or burning cell may heat the air inside the module common space and may cause an increase in air pressure within the module common space. If the increase in air pressure within the common space exceeds the air pressure in the manifold, the increased pressure in the module common space acting on the piston of the float valve will close the valve, preventing the discharge of heated air, thermal decomposition products and products of combustion into the manifold and hence into other battery modules. The module case protects surrounding modules from the heat. Separation between cell stacks and insulation between battery cells protect adjacent battery cells within the battery module and reduces the spread of fire to other battery cells.

Any suitable number of cell stacks may be included in a battery module and any suitable number of battery cells may be included in a cell stack. The numbers of battery cells and cell stacks will be based on the design voltage of the aircraft electrical drive motors. For example, for an aircraft with a nominal design voltage of 700 volts and using cells that produce 3.7 volts, a cell stack in which 50 cells are wired in series will produce a cell stack voltage of 185 volts. If the battery module includes four cell stacks wired in series, the nominal battery module voltage will be 740 volts when the module is substantially discharged. The voltage is higher when the battery cells are fully charged. Multiple battery modules are contained within the battery and are wired in parallel to provide 740 volts at a high current flow to the aircraft propulsion motor(s). Any other combination of battery cells and cell stacks per module is contemplated by the invention.

The battery frame may include supports for each of the battery modules so that a human user can slide the battery modules into or out of the battery frame from the outside surface of the battery for maintenance or for tailoring battery capabilities and weight to a specific aircraft mission. The supports may define shelves or brackets on which the modules will slide. When the battery module is installed in the battery, the module outer end is disposed proximal to the outside surface of the battery and the module inner end is disposed proximal to either the port or the starboard bulkhead.

The outside surface of the battery is openable so that a user may add or remove battery modules through the outside surface of the battery. Access panels may cover the outer ends of the battery modules when the battery modules are installed in the battery. The user may add or remove battery modules to replace battery modules in need of maintenance or to add or remove energy storage capability and weight to or from the battery to meet the requirements of a particular aircraft mission.

Any other structure for the battery frame is contemplated by the Invention. The battery frame may include rods or cables under tension to transfer the weight of the battery modules within the battery frame to the battery top side and hence to the top side of the aircraft opening. The battery frame may dispense with shelves or brackets and the module case may interlock with each adjacent module case so that the module cases are mutually supporting. The use of interlocking module cases avoids the weight of the brackets, shelves and associated structure within the battery frame, at the cost of less convenient access to individual modules.

A liquid heat transfer system controls the temperature of the battery cells during charging and an air heat transfer system controls the temperature of the battery cells during discharging, as during flight. A charging system includes the liquid heat transfer system, a charging electrical system to convey electrical power into the battery, and a charging battery management system to control charging, cell balancing, and monitoring the condition and state of the cells within the battery. The liquid heat transfer system includes the liquid heat transfer fluid, a heat exchanger to remove or add heat from or to the liquid heat transfer fluid, and pumps and piping to convey the liquid heat transfer fluid to and from the battery.

The battery is removed from the aircraft for charging. Separating the battery charging system from the aircraft avoids adding the weight of the charging system to the aircraft. Liquid heat transfer provides more effective heat transfer and less opportunity for a battery cell fire during charging, which allows increased current flow and faster charging of the battery compared to a charging system without liquid heat transfer. Separating the charging system from the aircraft also eliminates any danger to the aircraft from thermal runaway during battery charging.

The port and starboard bulkheads of the battery frame are spaced apart and define a manifold for the passage of liquid and gaseous heat transfer fluids between the bulkheads. When the module is inserted into the battery frame, the module common space of each module is in fluid communication with the manifold. During charging, the pumps and piping deliver liquid heat transfer fluid to the manifold through manifold fittings. The liquid heat transfer fluid flows through the manifold to the inner end of each of the modules installed in the battery. The liquid heat transfer fluid flows through the inlet port and the float valve of each battery module and through the module common space of each battery module. The liquid heat transfer fluid contacts the battery cells, which generate heat during the charging process, and heat the liquid heat transfer fluid. The heated liquid heat transfer fluid exits each battery module through an exit port on the outer end of the module. The charging heat transfer system collects the heated liquid heat transfer fluid and pipes the liquid heat transfer fluid through the heat exchanger. The cooled liquid heat transfer fluid then recirculates through the pump, piping and battery, carrying away more heat from the cells. If the temperature of the battery cells is too low for optimal charging, the charging battery management system may cause heat sources, such as resistance heaters, to warm the heat transfer fluid to warm the battery cells.

The battery frame may be configured so that the longitudinal axis of each battery module slopes in a downward direction when the battery module is installed in the battery frame so the that module lowest point is the location to which liquid heat transfer fluid will drain when the liquid heat transfer fluid is removed from the battery. When charging is complete, the liquid heat transfer fluid pumps are stopped and the liquid heat transfer fluid drains from the module, through the manifold and to the liquid heat transfer system. The float of each float valve is supported by the liquid heat transfer fluid at the module lowest point, so the float valve remains open as long as sufficient liquid heat transfer fluid is contained within the module common space. The charging system may purge the liquid heat transfer fluid from the common space and from the manifold using pressurized gas, such as air. The pressurized gas may be supplied to each module through the exit port.

When the battery is discharging, as when the aircraft is in flight, an air heat transfer system manages the temperature of the battery cells. Blowers, fans or scoops may generate a positive air pressure within the manifold. Any other apparatus to induce air flow through the manifold and common space is contemplated by the invention. The air flows through the manifold and through the module common space of each module to cool the battery cells. The heated air is discharged through the exit port at the module outer end and to the outside of the battery. An air pressure differential due to the Bernoulli relation caused by air flowing over the outside of the battery may pull air through the module common space. The blowers, fans or scoops may be under the control of the discharging battery management system. The discharging battery management system may be configured to open, close, or rotate the scoops based on the temperature of the battery cells and the direction and speed of relative wind. The discharging battery management system may include heat sources, such as resistance heaters, to warm the battery cells if the battery cells are at less than an optimum temperature. The heat sources may warm the air and the air may warm the battery cells; alternatively, the heat sources may be in direct contact with the battery cells and may warm the cells directly by conduction.

Definitions

The following terms have the following meanings, except as modified by the text and drawings of this document:

'Air heat transfer system'—The air heat transfer system means a system to duct air through the module common space when the battery is discharging, as when the aircraft is in flight. The air heat transfer system directs ambient air through openings in the battery frame and into the manifold. The air travels through the manifold, through the inlet port into the module common space, through the module common space and out through the exit port in the battery module to the outside of the battery frame. Alternatively, heat may flow by conduction from the battery cells through the battery module case and to the battery frame. Air flowing over the battery frame, as from the downwash of the rotor or relative wind due to the motion of the aircraft through the air, cools the battery frame by convection, which in turn cools the module case and the cells. The air heat transfer system may provide heat, as by resistance heaters, to warm the battery cells.

'Battery'—The battery comprises a battery frame supporting multiple battery modules, battery management system wiring, power buses, and power and battery management system connectors to connect the battery to the aircraft and to the charging system. The battery also may include structural connectors to attach the battery to the aircraft.

'Battery frame'—The battery frame releasably attaches to the aircraft and that provides structural support to the aircraft and to the removable battery modules. The battery frame includes forward and aft structural connectors to secure the battery frame to corresponding aircraft opening structural connectors. The forward and aft structural connectors transfer structural loads from the aircraft to the battery frame and from the battery frame to the aircraft. The battery frame may be configured to move liquid or gaseous heat transfer fluid to or from the module common spaces, to drain liquid heat transfer fluid from the module common spaces, and to vent heat and products of combustion in the event of a cell fire. The battery frame may include module connectors to releasably retain the modules to the battery frame. The battery frame may include one or more power buses to move electricity into and out of the modules and a discharge battery management system to control discharging of the battery cells and to assess the condition and wear of the cells.

'Battery system'—The battery system may comprise the battery to provide motive power to an aircraft. The battery system also may comprise a separate charging system to charge the battery when the battery is detached from the aircraft, a liquid heat transfer system incorporated into the charging system, and a charging battery management system incorporated into the charging system.

'Battery cell'—The battery cell is an individual electrochemical element that stores electrical power. Battery cells may be of any configuration, including without limitation pouch cells, prismatic cells and cylindrical cells, and may be of any battery chemistry allowing discharging and recharging of the battery cells, including without limitation lithium battery chemistry.

'Battery common space'—The battery common space is the module common space of all of the installed battery modules in combination. Liquid and gaseous heat transfer fluid may flow through the battery common space to heat or cool the battery cells.

'Battery module'—Each battery module encloses one or more cell stacks and contains electrical and battery management wiring for the battery cells and cell stacks. The battery module may be removed from or placed into the battery frame by a human operator or by an automated system when the battery is installed on the aircraft and when the battery is removed from the aircraft. Each battery module includes electrical connectors to connect or disconnect the power bus wiring of the battery module to the power bus wiring of the battery frame when the battery module is inserted into or removed from the battery frame. Each battery module includes connectors to connect or disconnect battery management system wiring of the battery module to the charging or discharging battery management system wiring of the battery frame when the battery module is inserted into or removed from the battery frame.

'Battery opening'—The battery opening is the opening in the fuselage of the aircraft that receives and retains the battery. Structural connectors on the forward end of the battery opening selectably attach to corresponding connectors on the forward end of the battery. Connectors on the aft end of the battery opening attach to corresponding connectors on the aft end of the battery. The connectors on the forward end of the battery opening transmit structural forces through the battery to the corresponding connectors on the aft end of the battery opening.

'Cell stack'—The cell stack is a group of adjacent battery cells. The adjacent battery cells of the cell stack may be electrically connected in series through a module power bus. The cell stack may include cell stack battery management system wiring. The cell stack may include a cell stack frame that supports the cells within the cell stack. The cell stack frame is not liquid or gas-tight, allowing liquid or gaseous heat transfer fluid to contact the cells during charging and discharging.

'Cell stack frame'—The cell stack frame means a structure supporting the cell stack, including supporting the cell stack within the battery module. The cell stack frame may be defined by the battery module case. The cell stack frame does not fully enclose the battery cells and allows fluid communication between the module common space and the battery cells of the cell stack.

'Charging battery management system'—The charging battery management system is part of the charging system and controls the charging of the battery. The charging battery management system may monitor the voltage and current flowing into the battery cells or battery modules and may monitor the temperature and flow of liquid head transfer fluid using sensors. The charging battery management system may monitor any other parameters needed for safe and effective operation of the battery and may balance the battery cells. The charging battery management system will maintain the battery within its safe operating area during charging, such as controlling for over current, over voltage, over or under temperature, and current leakage. The charging battery management system may control liquid heat transfer fluid flow during charging. The charging battery management system also may control heat exchangers to cool or to warm the liquid heat transfer fluid when the charging battery management system determines that the temperature of the cells should be decreased, increased, or maintained.

'Discharging battery management system'—The discharging battery management system controls the discharge of the battery, as during flight. The discharge battery management system may be physically housed within the battery or on the aircraft. The discharge battery management system may monitor battery conditions similar to those of the charging management system. The discharging battery management system may control the operation of air vents, scoops, blowers or fans feeding ambient air to the manifold to control the temperature of the battery cells. The discharging battery management system may control the operation of heaters to maintain the battery cells within the safe operating area of the battery cells.

'Combustion conduit'—The combustion conduit is the module common space leading to the exit port and is available to convey heated air, thermal decomposition products and products of combustion in the event of a battery cell overheating or of a battery cell fire. The combustion conduit is rapidly purged of heated air, thermal decomposition products and products of combustion by the air flowing through it. The heated air, thermal decomposition products, and products of combustion are ejected through the exit port to the outside of the battery. The module case protects adjacent modules from heat from the burning cell. Each battery cell may be separated from each other battery cell by a layer of insulation that reduces the adverse effect of a burning battery cell on adjacent battery cells. Each cell stack is separated from the other cell stacks in a module by a separation distance, to reduce the effect of a burning battery cell on an adjacent cell stack within the battery module.

'Inlet port'—The inlet port of each battery module provides fluid communication between the manifold and the module common space. The inlet port may include a valve, such as a float valve, controlling back flow of liquids or gas from the module common space to the manifold. The inlet port is located at or proximal to the lowest point of the module common space when the battery is attached to the charging system so that liquid heat transfer fluid may drain through the inlet port, to the manifold, and out of the battery when charging is complete and the flow of liquid heat transfer fluid is stopped.

'Inlet valve'—The inlet valve controls flow of liquid or gaseous heat transfer fluid through the inlet port. The inlet valve opens to allow heat transfer fluid to flow from the manifold to the module common space in response to the pressure of air or liquid heat transfer fluid in the manifold pressing on the piston of the inlet valve. The inlet valve may be a float valve that opens when liquid heat transfer fluid is present in the module common space at the inlet port, allowing liquid heat transfer fluid to drain from the inlet port to the manifold when charging is complete and the flow of liquid heat transfer fluid is stopped. The inlet valve may utilize any other valve configuration, such as an actively-controlled flap valve. The inlet valve closes when the module common space experiences air pressure within the module common space in excess of the air pressure in the manifold, such as in the event of a cell fire during flight. The closed inlet valve prevents heated air and products of combustion from flowing into the manifold and into other battery modules.

'Liquid heat transfer system'—The liquid heat transfer system is incorporated into the charging system and controls the temperature of the battery cells during charging when the battery is not attached to the aircraft. The liquid heat transfer fluid in the module common space physically contacts each cell, cooling or warming each cell as needed. The liquid heat transfer system includes a pump to move liquid heat transfer fluid into the manifold. From the manifold, the liquid heat transfer fluid circulates through the inlet port of each battery module, through the module common space of each battery module and in contact with each battery cell, through the exit port of each battery module, to a heat exchanger and back to the pump. When charging is complete, the liquid heat transfer fluid is removed from the manifold and from the battery modules, as by a compressed gas supplied through the exit port. The liquid heat transfer system provides increased safety during charging of battery.

'Manifold'—The manifold is defined by the battery frame and is a common flow path for liquid or gaseous heat transfer fluid to the inlet port of each of the battery modules. The manifold may be defined by the space between the port and starboard bulkheads of the battery.

'Module common space'—The module common space means space within the interior volume of each battery module that is not occupied by battery cells, cell stacks or other module components. Liquid or gaseous heat transfer fluid may flow through the module common space to warm or cool the battery cells. The module common space also defines the combustion conduit for the escape of heat, thermal decomposition products and products of combustion in the event of a battery cell thermal runaway or fire during flight.

'Exit port'—The exit port provides fluid communication from the module common space to the outside of the battery module and the outside of the battery. The exit port may communicate with ducts communicating with the heat exchanger when the battery is removed from the aircraft and attached to the liquid heat transfer system. The exit port may communicate with the outside surface of the battery when the battery is attached to the aircraft fuselage to allow discharge of air acting as the heat transfer fluid and, in the event of a cell fire, to allow discharge of heated air, decomposition products and products of combustion outside of the battery.

'Port and starboard bulkheads'—The port and starboard bulkheads are generally parallel, generally planar structural elements of the battery frame. The longitudinal axis of the aircraft is generally parallel to the planes defined by the port and starboard bulkheads when the battery is installed on the aircraft. The lower edges of the port and starboard bulkheads are attached to the ventral keel. The port and starboard bulkheads provide structural stiffening of the ventral keel and resist flexure of the aircraft along its longitudinal axis when the battery is attached to the aircraft. The port and starboard bulkheads also support the battery modules and together define a manifold to convey liquid or gaseous heat transfer fluid to the battery modules.

The 'ventral keel' is a structural component of the battery frame and extends from the forward end of the battery frame to the aft end of the battery frame along the ventral side of the battery when the battery is attached to the aircraft. The ventral keel, in combination with the port and starboard bulkheads, transmits compression and tension forces from forward and aft structural connectors attaching the forward and aft ends of the battery frame to the aircraft.

III. BRIEF DESCRIPTION OF THE DRAWINGS

Figure 2:
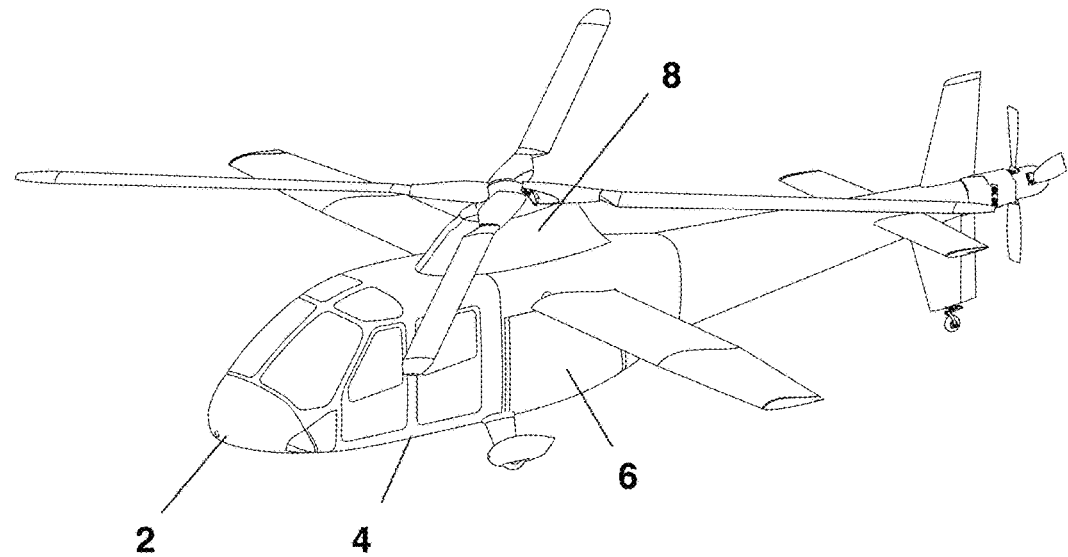
Figure 3:
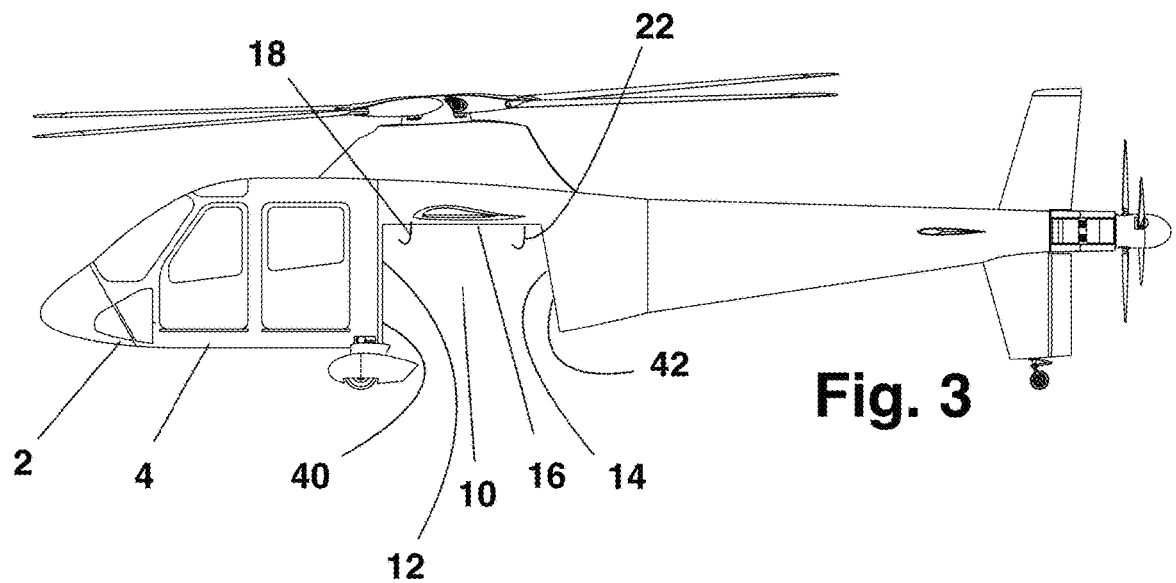
Figure 4:
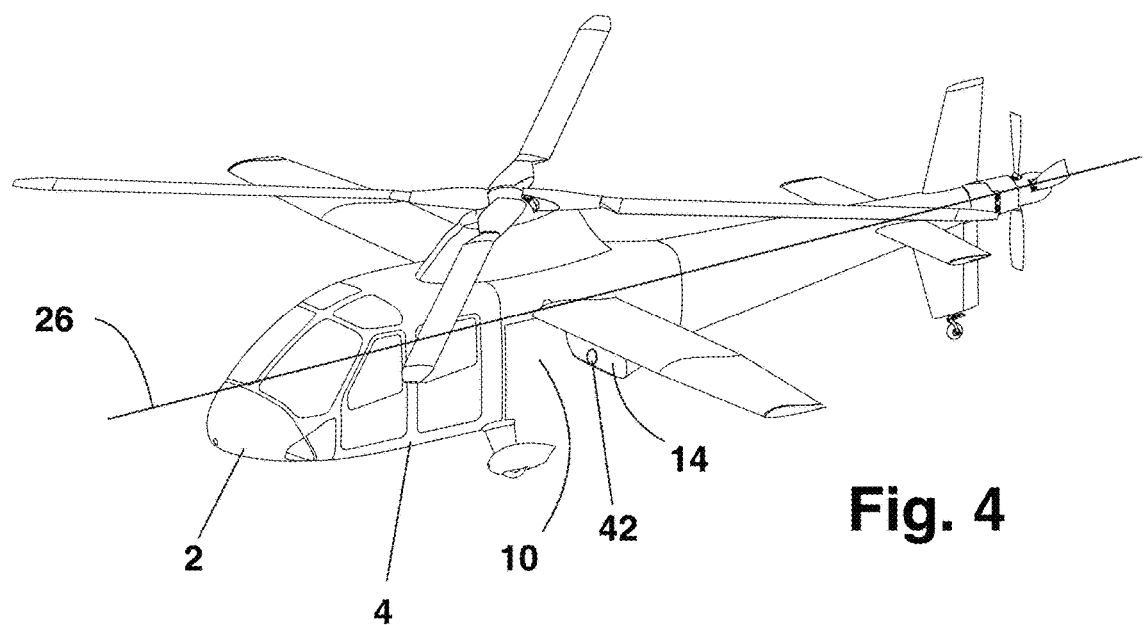
Figure 8:
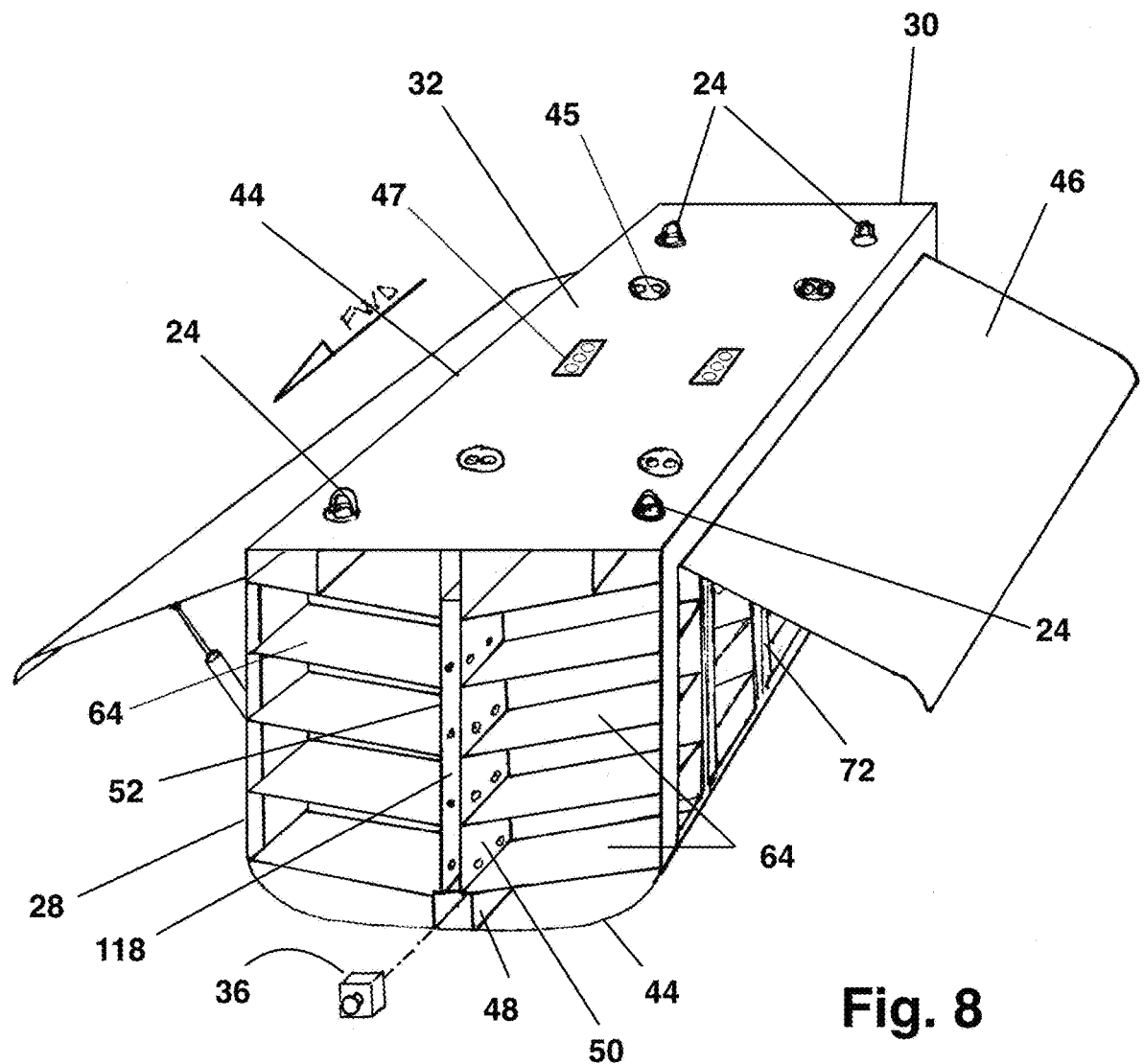
Figure 9:
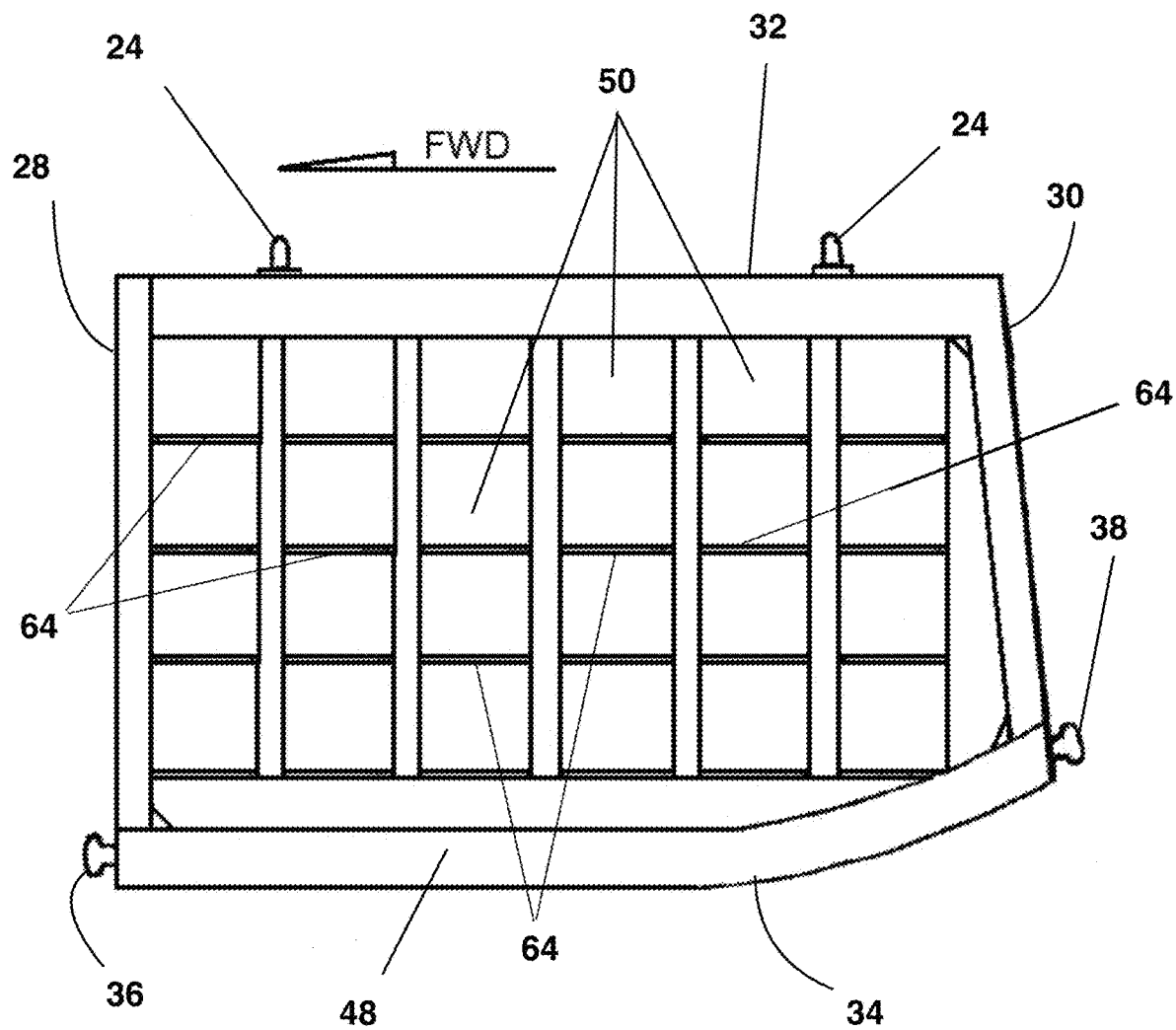
Figure 12:
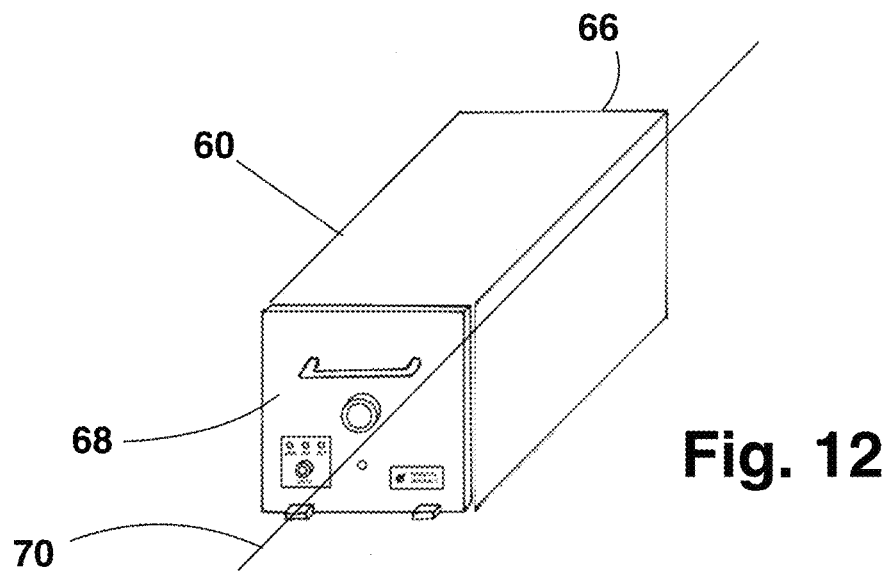
Figure 13:
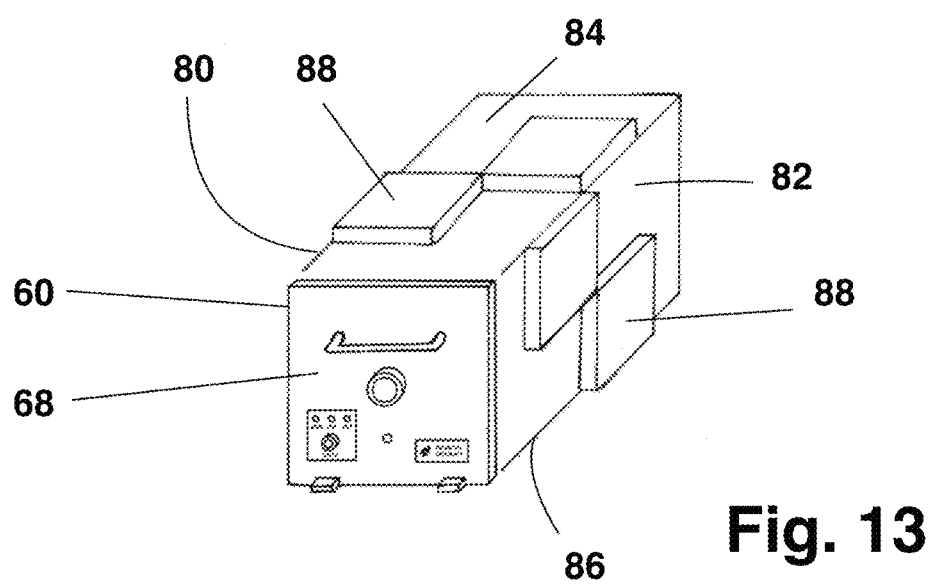
Figure 14:
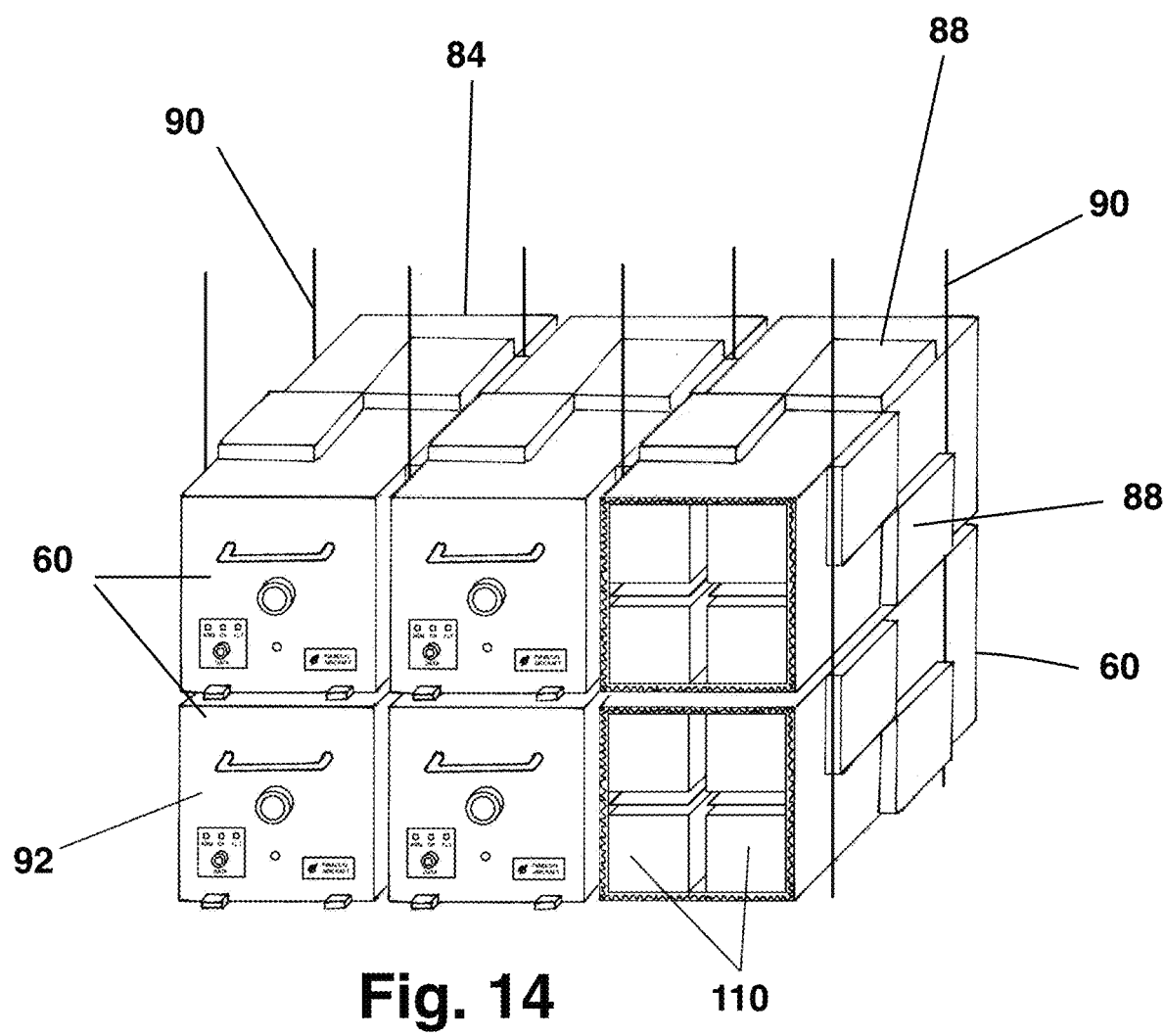
Figure 18:
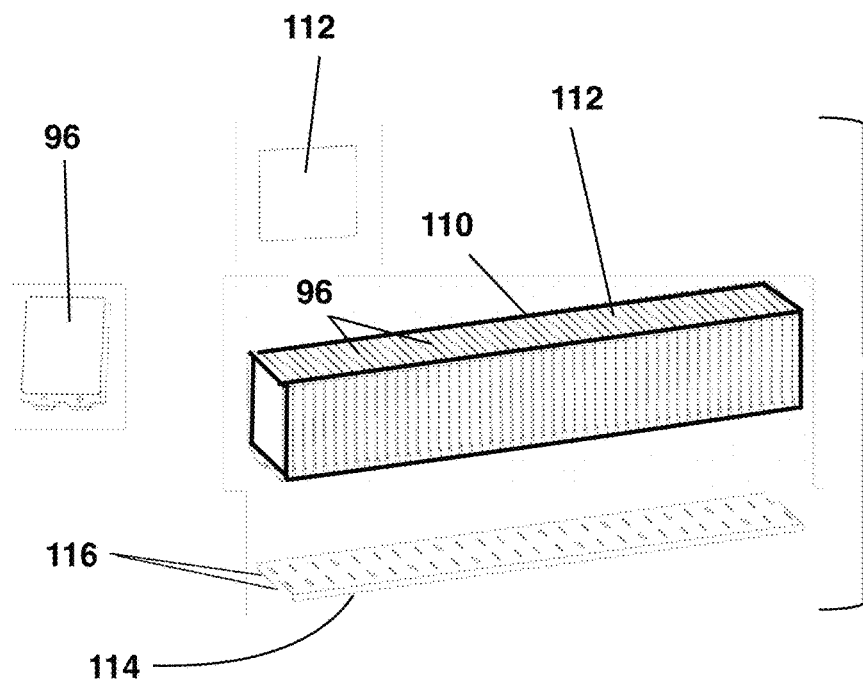
Figure 19:
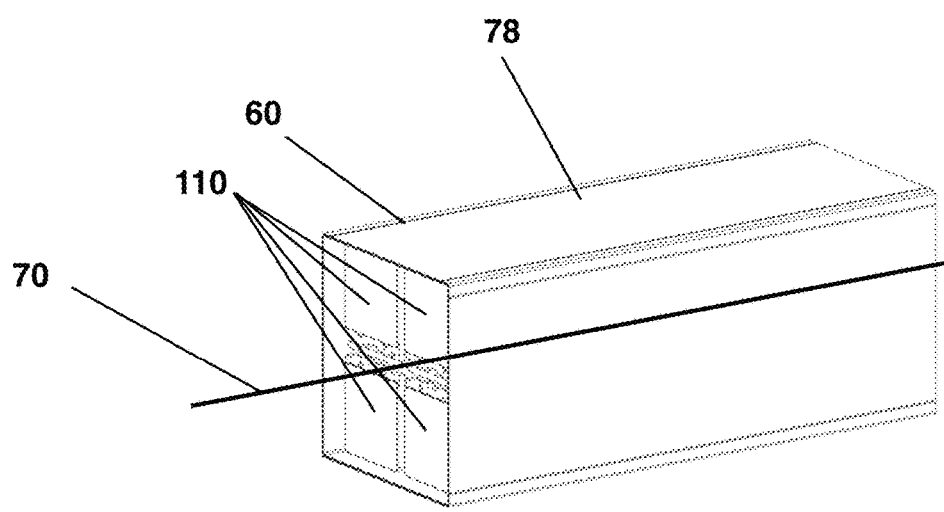
Figure 20:
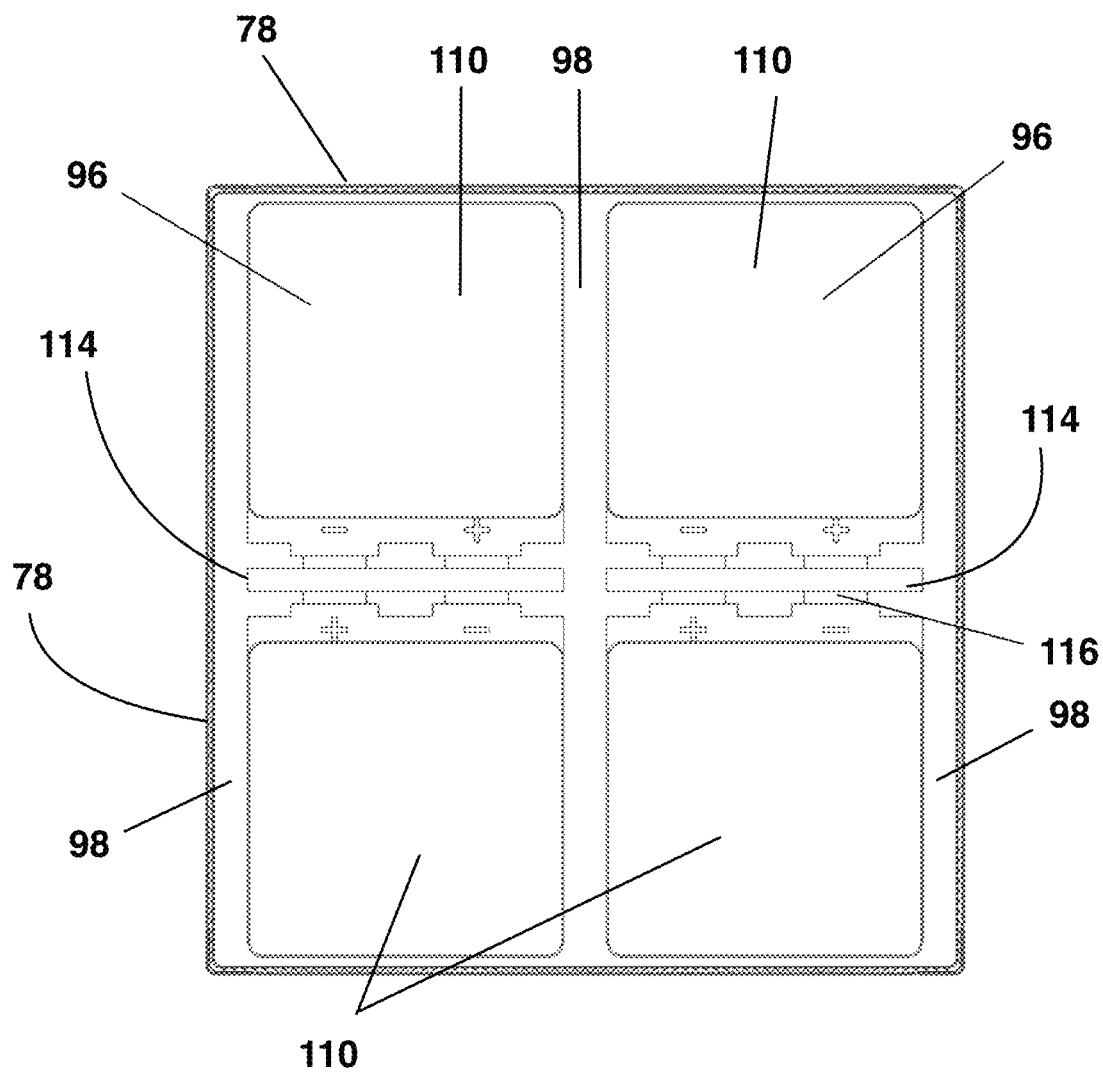
Figure 21:
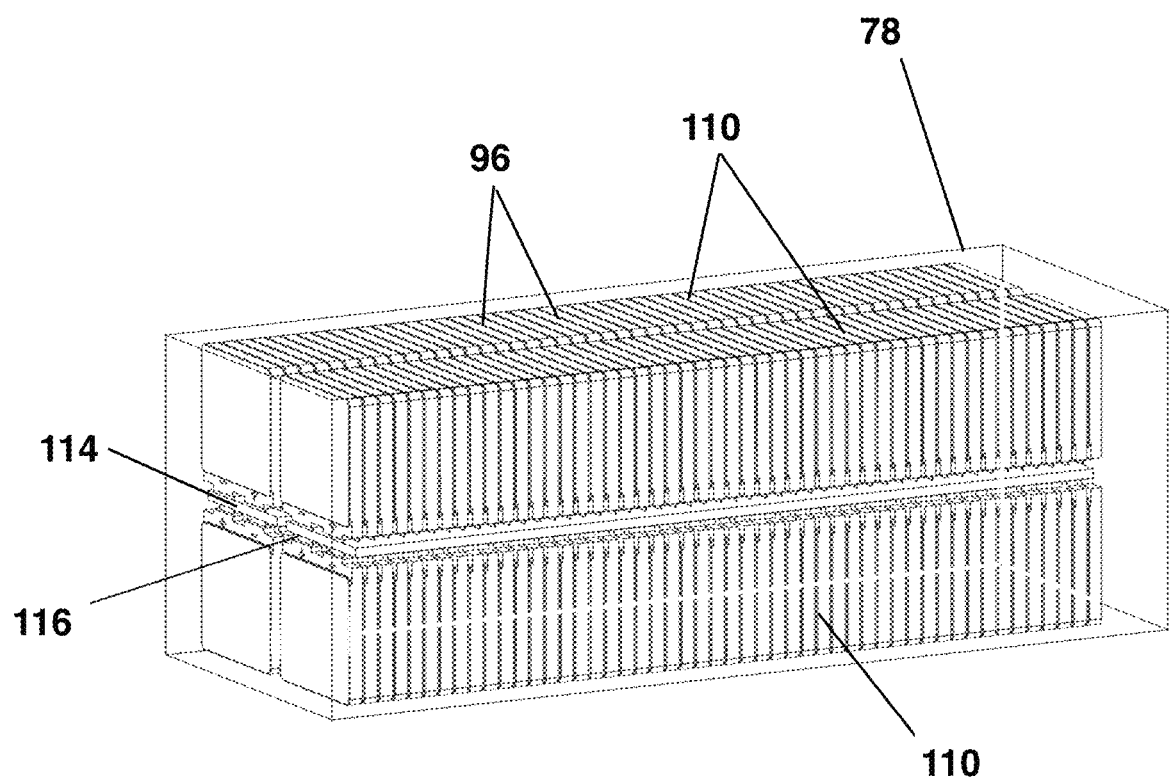
Figure 22:
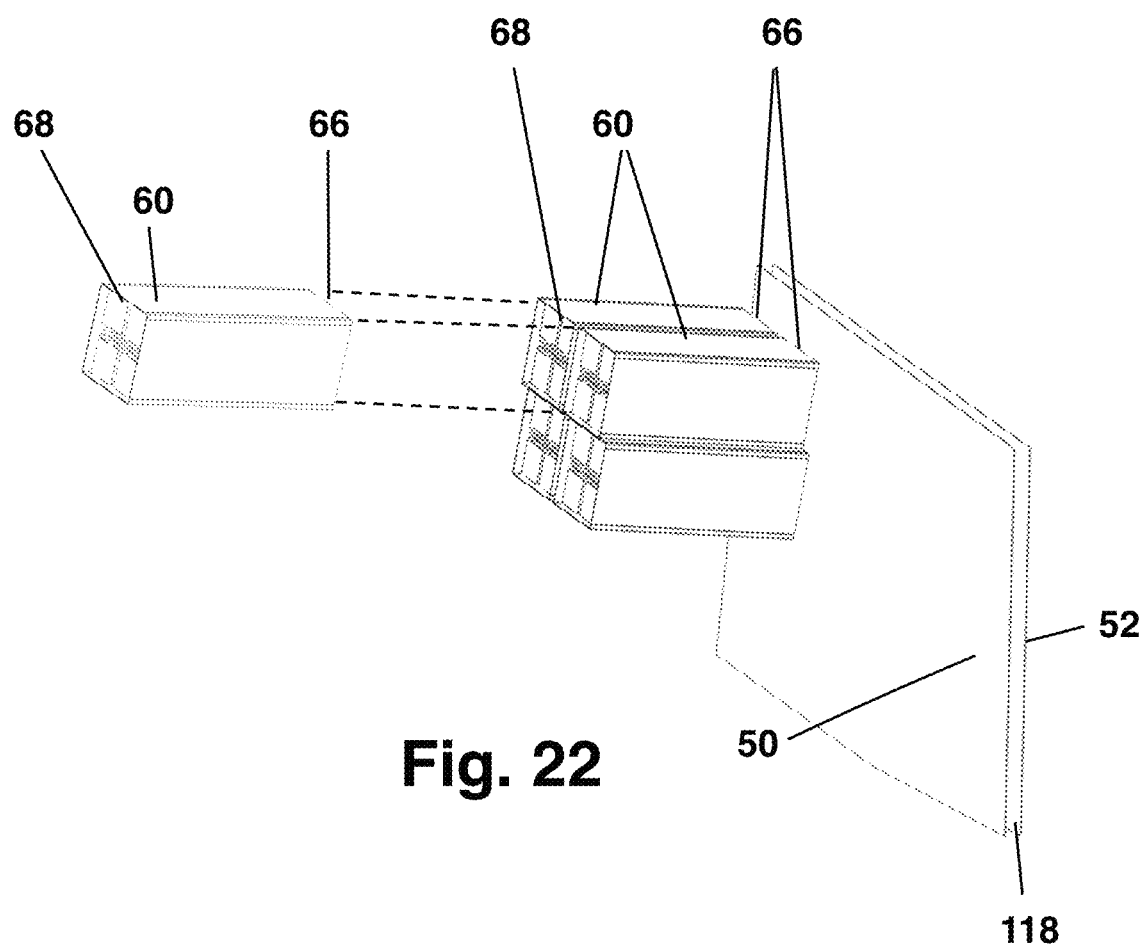
Figure 23:
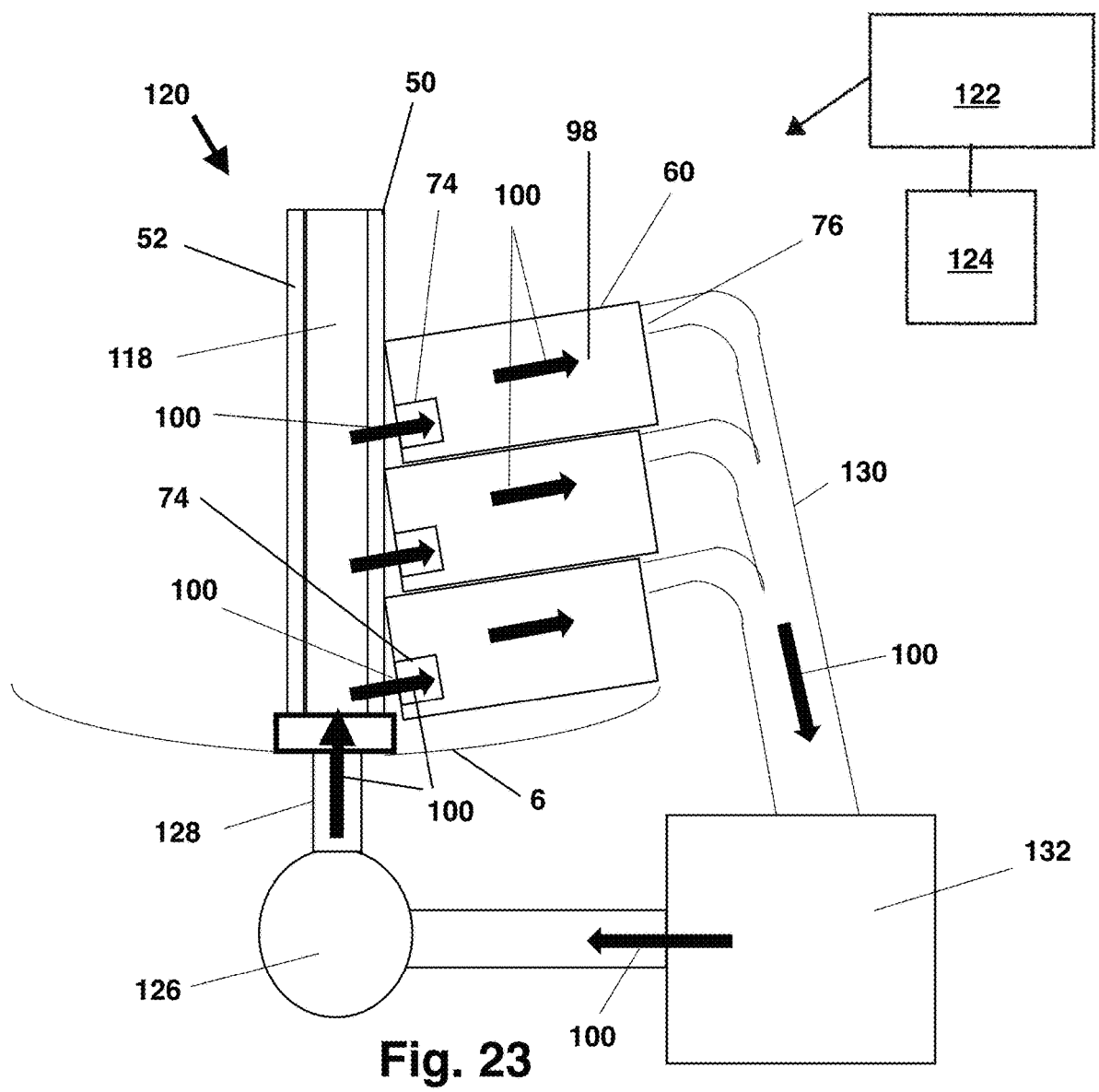
Figure 24:
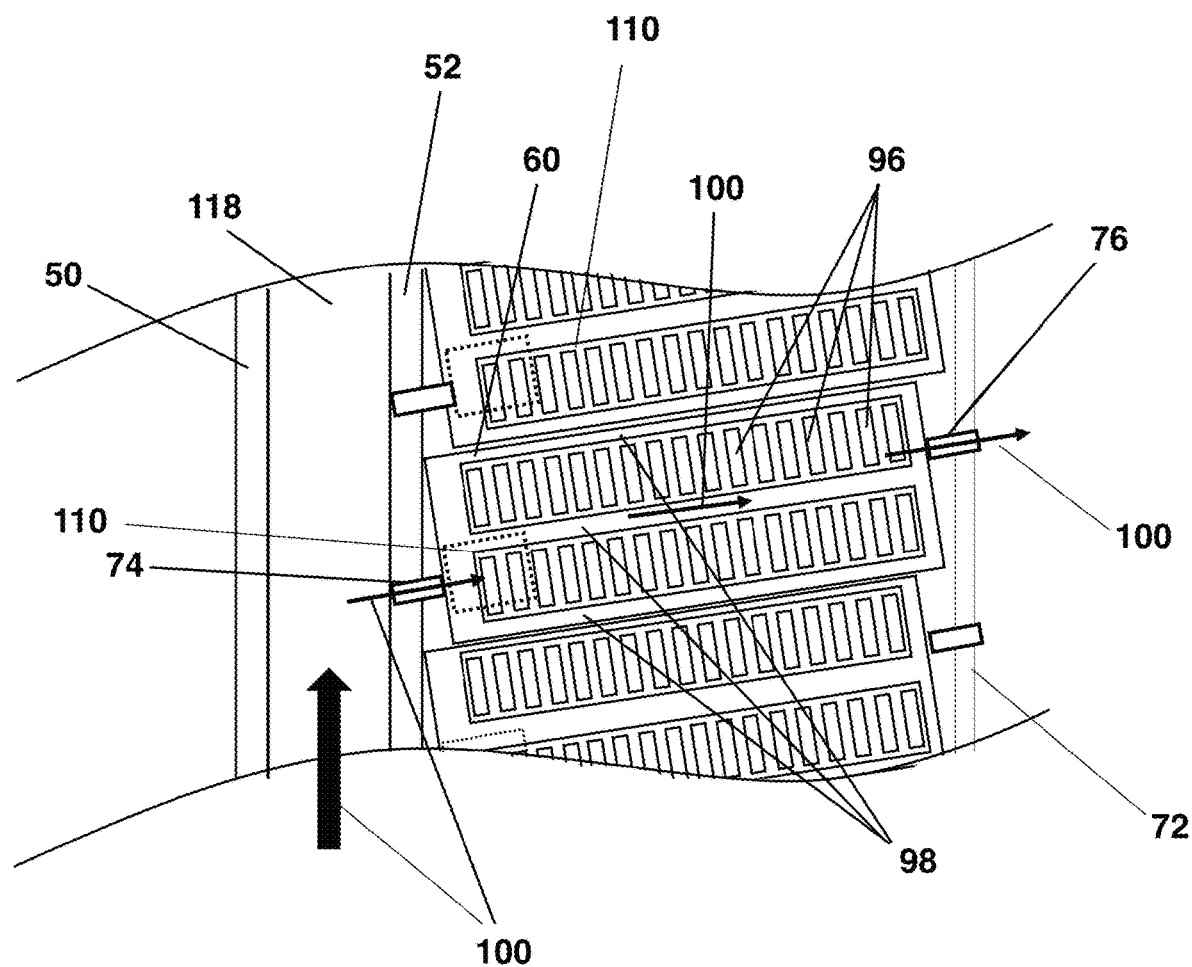
Figure 25:
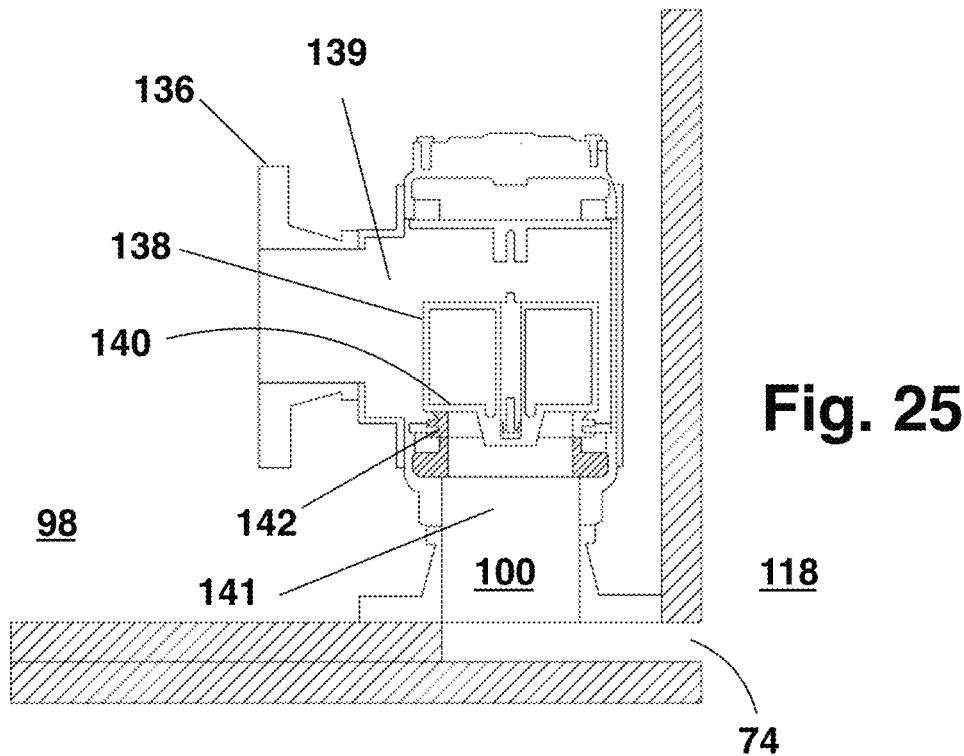
Figure 26:
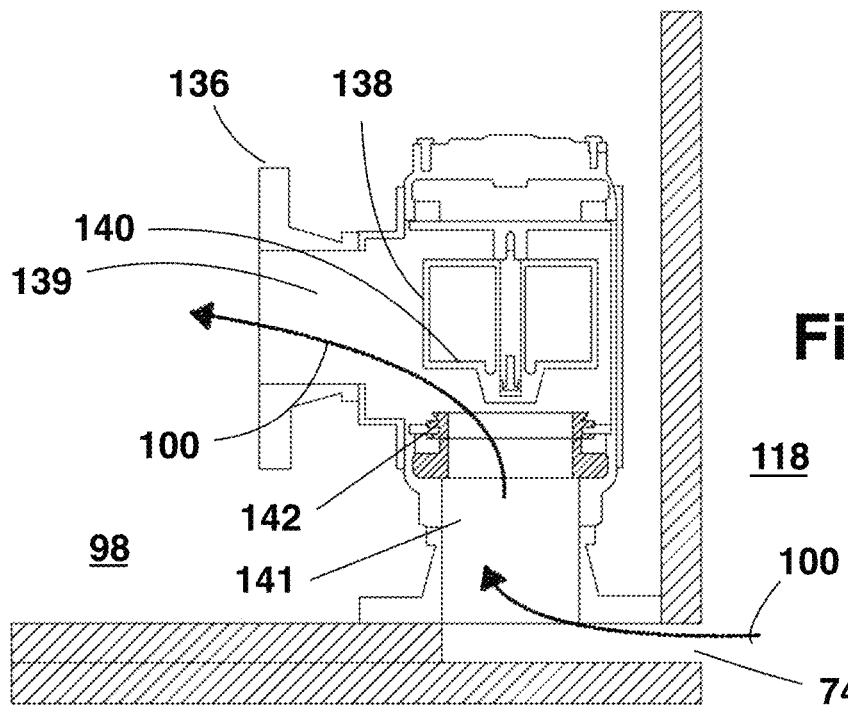
Figure 27:
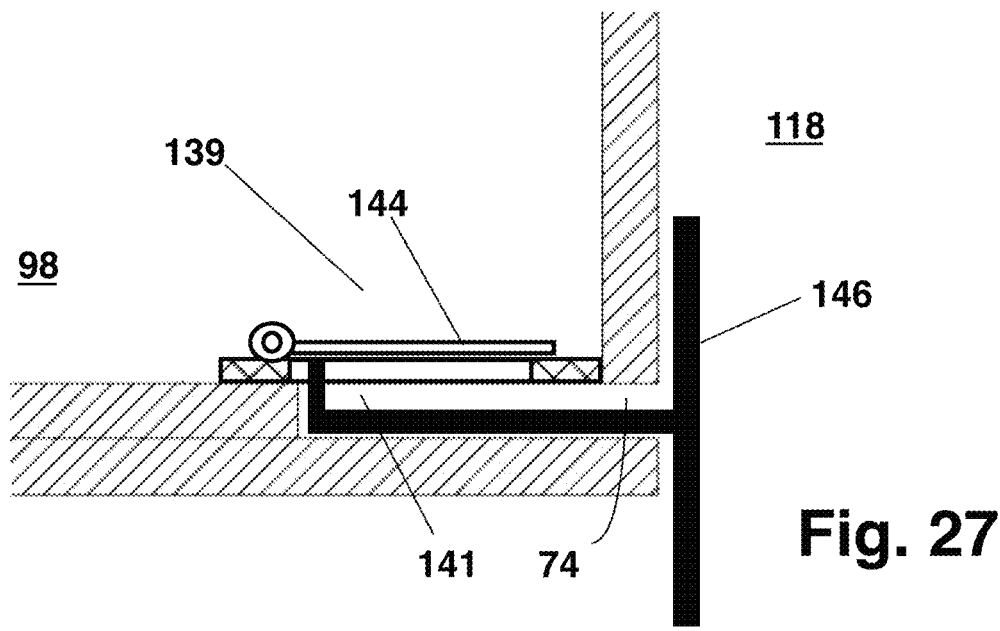
Figure 28:
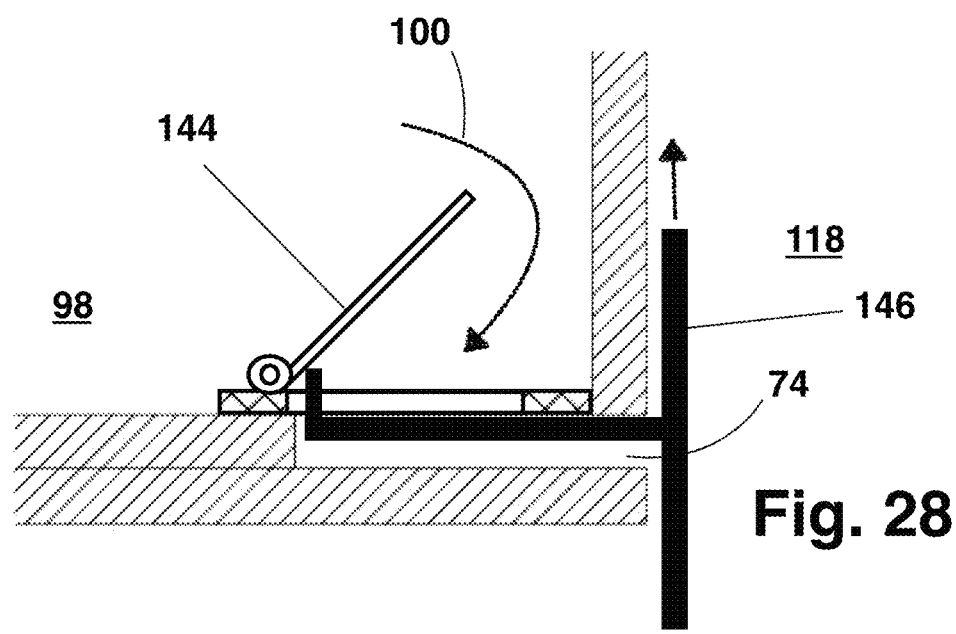
Figure 29:
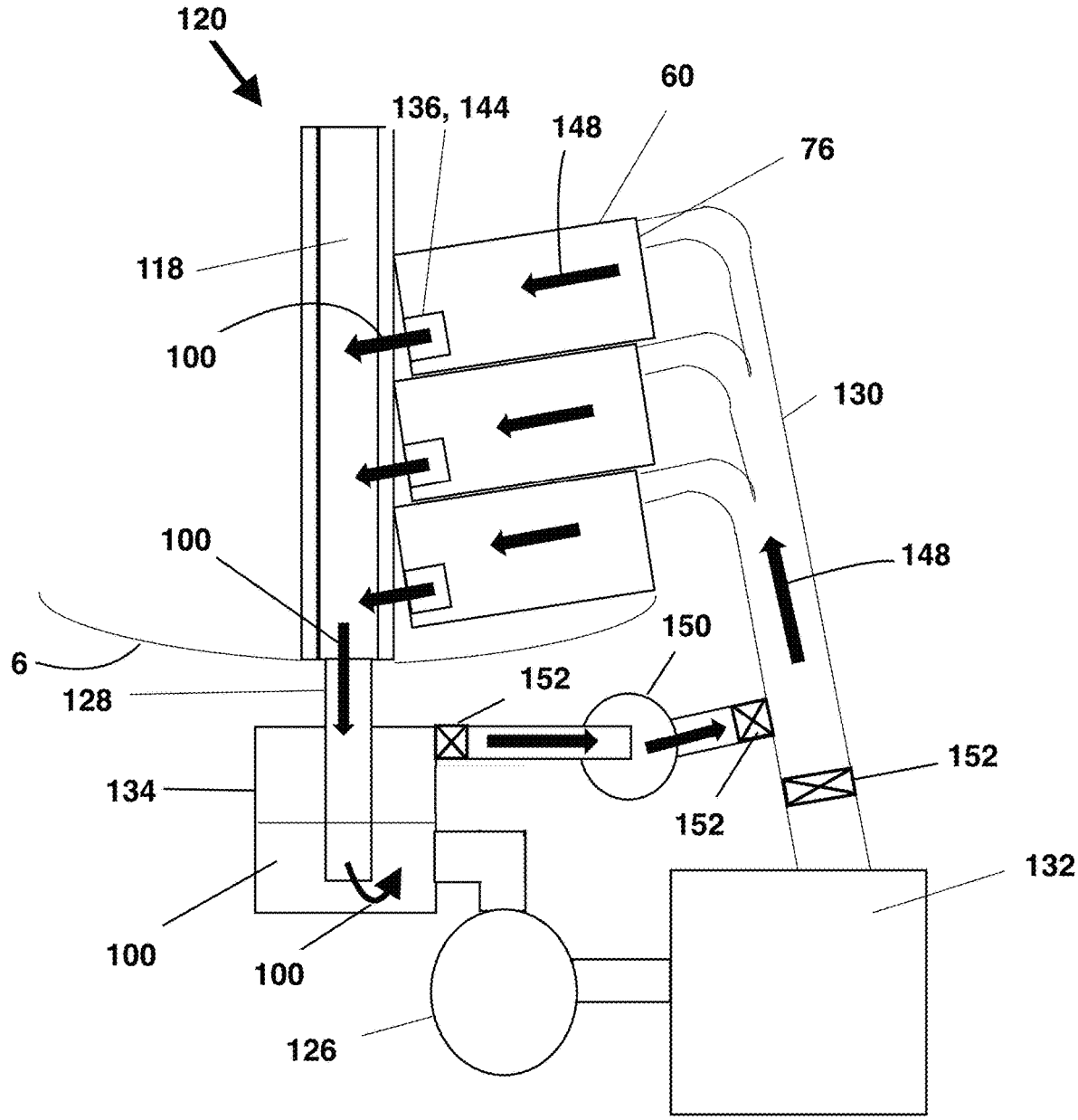
Figure 30:
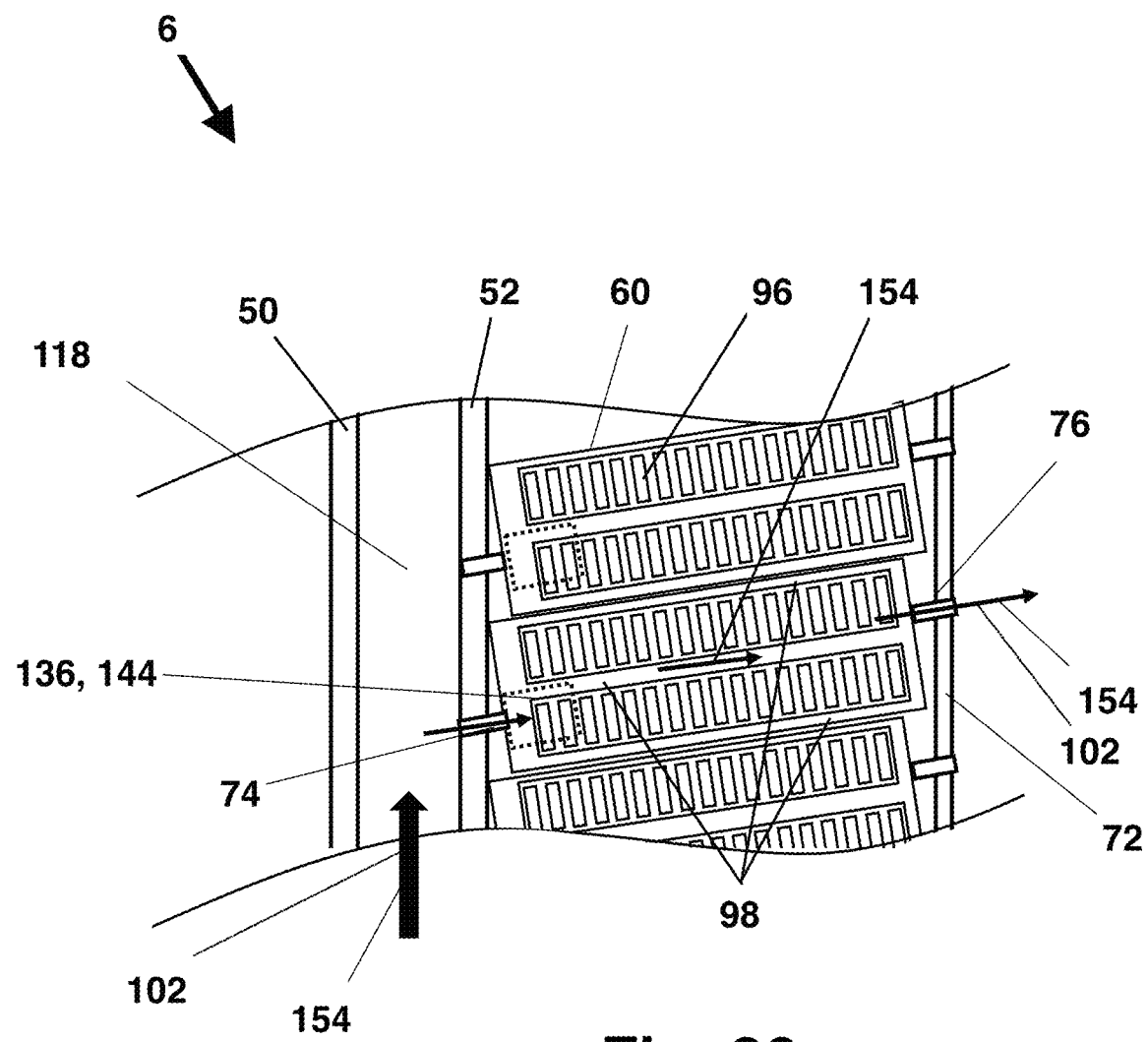
Figure 31:
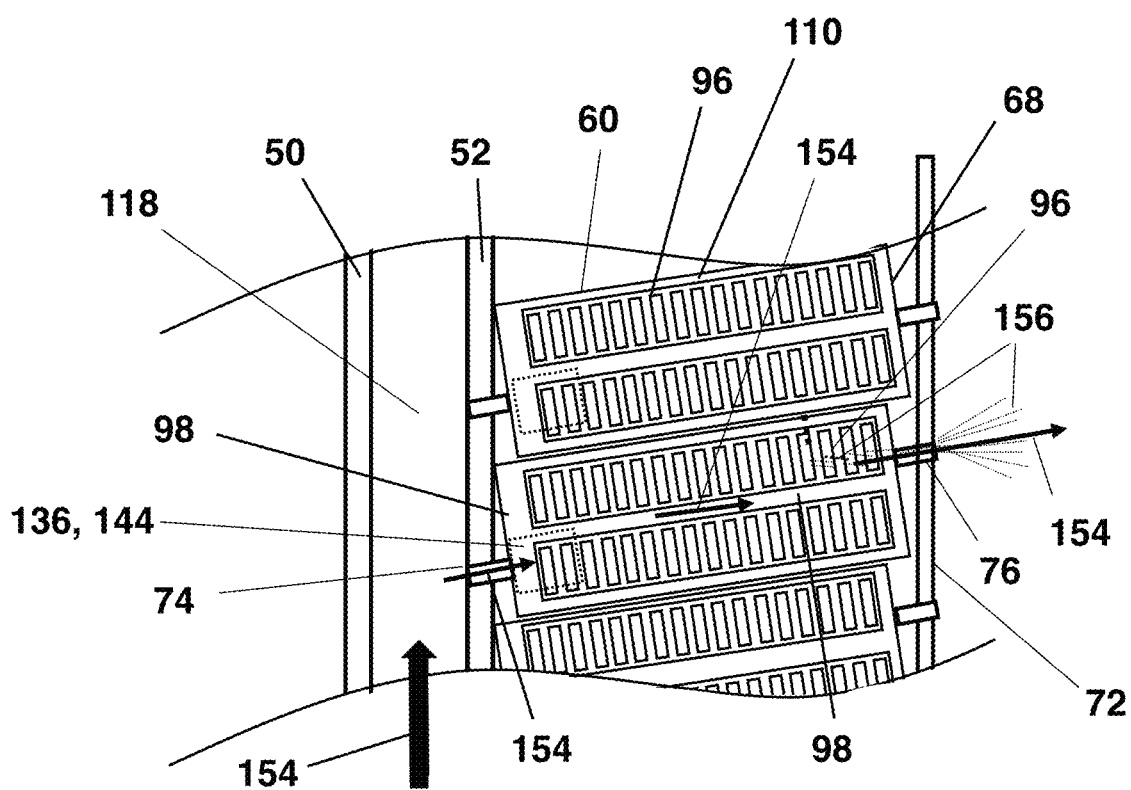

FIG. 1 shows an electrically-powered aircraft.
FIG. 2 is a perspective view of the aircraft.
FIG. 3 shows the aircraft with the battery removed.
FIG. 4 shows the aircraft with the battery removed.
FIG. 5 is a view of the battery.
FIG. 6 is a view of the battery.
FIG. 7 is a section front view of the battery.
FIG. 8 is a cutaway perspective view of the battery frame.
FIG. 9 is a side view of the battery frame with an access cover removed.
FIG. 10 illustrates one embodiment of the forward and aft battery structural connectors and corresponding aircraft structural connectors.
FIG. 11 illustrates one embodiment of the forward and aft battery structural connectors and corresponding aircraft structural connectors.
FIG. 12 illustrates an example battery module.
FIG. 13 illustrates a structure for the battery frame and battery module.
FIG. 14 illustrates a structure for the battery frame and battery module.
FIG. 15 is a perspective view of the battery module of FIG. 12.
FIG. 16 is the back cover of the battery module.
FIG. 17 is the front cover of the battery module.
FIG. 18 is an exploded view of a battery module.
FIG. 19 shows a battery module with a longitudinal axis.
FIG. 20 is a sectional end view through the battery module.
FIG. 21 is a perspective cutaway view of the battery module.
FIG. 22 shows one battery module being installed in the battery.
FIG. 23 is a schematic diagram of a charging system for the battery.
FIG. 24 is a detail view of the liquid heat transfer fluid flow.
FIG. 25 shows the float valve in the closed position.
FIG. 26 shows the float valve in the open position.
FIG. 27 shows a flap valve.
FIG. 28 shows a flap valve.
FIG. 29 shows purge air introduced to the exit port of the liquid heat exchange system.
FIG. 30 shows air as a gaseous heat transfer fluid when the battery is discharging.
FIG. 31 is a schematic drawing of the flow of heated air, decomposition products and products of combustion in the event of a cell fire during flight.

IV. DESCRIPTION OF AN EMBODIMENT

FIG. 1 shows an electrically-powered aircraft 2, in this instance a compound aircraft 2, that has a fuselage 4 and is powered by a removable battery 6. The aircraft 2 may be of any configuration, including fixed-wing, rotary-wing and lighter-than-air aircraft 2. In FIG. 1 the battery 6 is shown installed in the aircraft fuselage 4. The battery 6 may be installed in any aircraft structure, as required by the configuration of the aircraft 2. FIG. 2 is a perspective view of the aircraft 2 of FIG. 1, with the battery 6 installed in the fuselage 4. The battery 6 selectably powers an aircraft drive motor 8 to provide motive power to the aircraft 2.

The side view of FIG. 3 and the perspective view of FIG. 4 show the aircraft 2 of FIG. 1 with the battery 6 removed from the aircraft 2. The aircraft 2 defines an aircraft opening 10 to receive and retain the battery 6. The aircraft opening 10 defines an aircraft opening forward side 12, an aircraft opening aft side 14 and an aircraft opening 10 top side 16. The aircraft opening forward and aft sides 12, 14 define aircraft structural connectors 40, 42 that selectably mate with corresponding battery structural connectors 36, 38. As described below, the aircraft and battery structural connectors convey tension and compression loads to and from the battery 6 so that the battery 6 is a structural component of the aircraft 2.

The aircraft opening top side 16 includes aircraft supports 18 that support the weight of the battery 6 when the battery 6 is installed in the aircraft opening 10. The aircraft supports 18 engage corresponding battery supports 20 on the battery 6. The aircraft supports 18 may be hooks 22 that engage corresponding rings 24 on the battery 6. The aircraft supports 18 may be any other structure that will support the battery 6, including pins, rods, clamps, threaded fasteners, cables, chains, hoists, or any other suitable structure. The aircraft 2 defines an aircraft longitudinal axis 26, shown by FIG. 4.

FIGS. 5 and 6 are a perspective view and a side view of the battery 6 removed from the aircraft 2. The battery 6 defines a battery forward side 28, a battery aft side 30, a battery top side 32 and a battery ventral side 34. In the example of FIGS. 5 and 6, the battery top side 32 includes rings 24 as the battery supports 20. The battery supports 20 may be any structure that corresponds to the aircraft supports 18 on the aircraft opening top side 16 to retain the battery 6 in the aircraft opening 10. The forward battery structural connector 36 and aft battery structural connector 38 are disposed on the forward battery and aft sides 28, 30. The forward battery and aft structural connectors 36, 38 engage a corresponding forward aircraft structural connector 40 and an aft aircraft structural connector 42 to convey tension and compression forces between the fuselage 4 and the battery 6 and between the battery 6 and the fuselage 4.

The battery 6 is a structural component of the aircraft 2. FIGS. 7 through 14 show the structural features of the battery 6. The battery 6 includes a battery frame 44 that is attachable to and removable from the aircraft 2. The battery frame 44 supports the other battery 6 components and provides structural support to the aircraft 2. FIG. 7 is a section front view of the battery 6. FIG. 8 is a cutaway perspective view of the battery frame 44. FIG. 9 is a side view of the battery frame 44 with an access cover 46 removed.

From FIGS. 7, 8 and 9, the battery frame 44 includes a ventral keel 48 that extends along the ventral side 34 of the battery 6 from the battery forward side 28 to the battery aft side 30. The ventral keel 48 is a structural beam that terminates on either end in the forward and aft battery structural connectors 36, 38. A port bulkhead 50 and a starboard bulkhead 52 are generally planar components of the battery frame 44 and are attached to the ventral keel 48. The port and starboard bulkheads 50, 52 extend upward from the ventral keel 48 toward the aircraft 2 longitudinal axis 26. A vertical mathematical plane passing through the aircraft longitudinal axis 26 extends between the port and starboard bulkheads 50, 52 when the battery 6 is attached to the aircraft 2. The port and starboard bulkheads 50, 52 reinforce the ventral keel 48 and hence the battery 6.

When the battery 6 is attached to the aircraft 2, the ventral keel 48 and the port and starboard bulkheads 50, 52 shown by FIGS. 7, 8 and 9 reinforce the structure of the aircraft 2 and resist deformation of the fuselage 4 in flexure in response to flight and crash loads. The battery forward side 28 includes the forward battery structural connector 36 at the ventral keel 48. The forward battery structural connector 36 is configured to releasably attach to the corresponding forward aircraft structural connector 40. The forward battery structural connector 36 and forward aircraft structural connector 40 are configured to transmit both tension and compression loads from the aircraft opening forward side 12 to the ventral keel 48 and to the port bulkhead 50 and starboard bulkhead 52. The ventral keel 48 and the port and starboard bulkheads 50, 52 transmit the tension and compression loads to the aft battery structural connector 38 and to the corresponding aft aircraft structural connector 42. The structural connectors 36, 38, 40, 42 and the ventral keel 48 and port and starboard bulkheads 50, 52 are in a spaced-apart relation to the aircraft longitudinal axis 26. As a result, the battery frame 44 resists flexure, or bending, of the fuselage 4 in the vertical mathematical plane passing through the aircraft longitudinal axis 26. The aircraft 2 meets required flight and crash structural loads with the battery 6 installed and may not meet required flight and crash loads with the battery removed FIGS. 10 and 11 illustrate one embodiment of the forward and aft battery structural connectors 36, 38 and the corresponding aircraft structural connectors 40, 42. FIG. 11 is a section view of a joined forward battery structural connector 36 and forward aircraft structural connector 40. From FIG. 11, a mushroom-shaped forward battery structural connector 36 is rigidly attached to the battery forward side 28 at the ventral keel 48. The forward aircraft structural connector 40 defines a rotary lock 54. When the battery 6 is installed in the aircraft opening 10, the mushroom-shaped forward battery structural connector 36 engages a V-shaped opening 56 in the rotary lock 54. The V-shaped opening 56 rotates around bearings 58, trapping the mushroom-shaped forward battery structural connector 36. As noted, any other suitable apparatus to transfer tension and compression loads between the aircraft opening 10 forward side and the battery forward side 28 is contemplated by the Invention, including pin connectors, dovetail connectors, T-shaped connectors, threaded fasteners, hooks, clamps, rods, chains or cables. The connection of the aft battery structural connector 38 and the aft aircraft structural connector 42 is the same as the forward battery structural connector 36 and forward aircraft structural connector 40.

As shown by FIGS. 7, 8, 9 and 12, the battery frame 44 is configured to receive and to retain a plurality of battery modules 60. An example battery module 60 is illustrated by FIG. 12. As described below, the battery modules 60 contain the battery cells 62 that store and release electrical energy. From FIG. 12, the battery module 60 has a module inner end 66, a module outer end 68 and a module longitudinal axis 70.

FIGS. 8 and 9 show one configuration of the battery frame 44 to receive and retain a battery module 60 is that the battery frame 44 defines a shelf 64 or bracket corresponding to each battery module 60. FIGS. 8 and 9 show the battery frame 44 with the battery modules 60 removed. To add or remove a battery module 60 from the battery 6, a human user or automated system slides the battery module 60 onto the shelf 64 from the outside surface 72 of the battery frame 44 along the module longitudinal axis 70 until the module inner end 66 engages the port or starboard bulkhead 50, 52. The human user may remove the battery module 60 from the battery when the battery 6 is attached to the aircraft 2 to service the battery 6 or to adjust the weight and energy capabilities to the battery 6 to match the requirement of a particular use or mission of the aircraft 2. The battery module 60 also may be removed from or added to the battery by the human user when the battery is not attached to the aircraft 2.

FIGS. 13 and 14 illustrate a structure for the battery frame 44 and battery module 60 alternative to the shelves 64 shown by FIGS. 8 and 9. In the alternative of FIGS. 13 and 14, each battery module 60 defines a module case 78 that houses the battery module 60 components. The module case 78 has a left, right, top and bottom side 80, 82, 84, 86. Each of the module case left, right, top and bottom sides 80, 82, 84, 86 includes interlocks 88 that engage the corresponding interlocks 88 on the module case 78 of each other adjacent battery module 60 so that two adjacent battery module 60 will not slide with respect to each other. In the example of FIGS. 13 and 14, the interlocks 88 are a series of blocks or bosses defined by the left side, right side, top and bottom 80, 82, 84, 86 of the case 78 of each battery module 60.

The battery module 60 interlock 88 of FIGS. 13 and 14 may take any form that prevents sliding of one battery module 60 with respect to another battery module 60 along a mathematical plane defined by the left side, right side, top or bottom 80, 82, 84, 86 of the module case 78. For example, pins on the right side 82 of a battery module 60 may engage holes defined by the left side 80 of an adjacent battery module 60. Each battery module 60 is configured so that it is interchangeable with every other battery module 60. For example, if each battery module 60 includes pins on a top side 84 of the module case 78, then each other battery module 60 will include holes on the bottom side 86 of the battery module 60 configured to engage the pins. The interlocks 88 may define mating bosses, blocks, pins, grooves, ridges, slots or holes.

From FIG. 14, the battery frame 44 may include cables or rods 90 in tension to pull the interlocked battery module 60 together and to attach the battery modules 60 to the battery frame 44. The battery modules 60 of FIG. 14 are shown from the outside of the battery 6, with the battery outside surface 72 and access panels 46 removed for clarity. The alternative of interlocking battery module 60 saves weight, but is less easily serviced than the structure with shelves 64 or brackets shown by FIGS. 8 and 9.

The electrical structure of the battery and battery module 60 is addressed by FIGS. 15 through 21.

FIG. 15 is a perspective view of the battery module 60 of FIG. 12 with the front cover 92 and back cover 94 removed. FIGS. 16 and 17 are the back cover 94 and front cover 92, respectively. The battery cells 96 are contained within the module case 78. The module case 78 defines a module common space 98 that allows a liquid heat transfer fluid 100 or gaseous heat transfer fluid 102 to move through the module common space 98 from the inlet port 74 on the module back cover 94 to the exit port 76 on the module front cover 92 and to contact each of the battery cells 96. The sum of the module common spaces 98 of the battery modules 60 in the battery 60 is the battery common space. The front and back panels 92, 94 are sealed to the module case 78 so that the battery module 60 is substantially fluid-tight, other than through the inlet and exit ports 74, 76. The module common space 98 and the inlet and exit ports 74, 76 are discussed in more detail below relating to thermal management of the battery 6.

The module case 78 supports the cell stacks 110, module power busses to convey electricity to and from the battery cells 96, module power bus connectors 106, the battery management system wiring for the battery cells 96 within the battery module 60, and battery management system connectors 108. The module power bus connectors 106 and battery management system connectors 108 connect to the frame power bus and frame battery management bus, which is turn connect to battery power bus connectors 45 and battery management system connectors 47, shown by FIG. 8. The battery power bus connectors 45 connect to the aircraft drive motor 8 when the battery 6 is installed on the aircraft 2 and connect to the battery charging system 120 when the battery 6 is being charged. The battery management system connectors 47 connect to the charging battery management system 124 when the battery is being charged and to the discharging battery management system when the battery 6 is installed on the aircraft 2.

From FIGS. 15 and 18-21 and particularly the exploded view of FIG. 18, the battery cells 96 within the battery module 60 are organized into cell stacks 110. Each cell stack 110 includes a plurality of adjacent battery cells 96, for example 50 battery cells 96. The battery cells of FIG. 18 are shown as pouch battery cells, but may be of any configuration. The battery cells 96 are separated by cell insulators 112. The cell insulators 112 provide thermal and electrical separation between the adjacent battery cells 96 to avoid one cell 96 affecting another electrically and reduce the likelihood that a cell fire may spread to other battery cells 96. Each battery cell 96 is connected to a module power bus 116 to move electrical energy into and out of the battery cell 96. The battery cells 96 in the cell stack 110, cell insulators 112 and module power bus 116 may be supported by a cell stack frame. 114 The cell stack frame 114 is not sealed and allows liquid or gaseous heat transfer fluid 100, 102 to move through the cell stack frame 114 and to contact the battery cells 96. The cell stack frame 114 may compress the battery cells 96 and cell insulators 112. The battery cells in the cell stack are electrically connected through a module power bus 116. Cell stack battery management system wiring also communicates with each of the battery cells 96 of the cell stack 110.

FIGS. 15, 19, 20 and 21 show four cell stacks 110 in the battery module 60, but any number of cell stacks 110 may be housed in the battery module 60, as required by the application. A consideration is that the modules 60 may be handled by a human operator and the weight of the module 60 should be such that a single human being can lift and carry the module 60. As noted above, another consideration is the design voltage of the aircraft 2 propulsion system. The battery cells 96 of each battery module 60 may be wired in series to provide an adequately high voltage, while battery modules 60 within the battery may be wired in parallel to provide an adequate current supply. Any combination of parallel and series wiring of the battery cells, 96 cell stacks 110 and modules 60 to meet the electrical requirements of the aircraft 2 is contemplated by the Invention.

From FIG. 19, the battery module 60 defines a longitudinal axis 70. When the human operator (or an automated system) adds or removes battery modules 60 from the battery 6, the operator will slide the module 60 into or out of the battery 60 along the longitudinal axis 70 of the battery module 60. While FIGS. 19, 20 and 22 show the battery module 60 with the front or rear cover 92, 94 removed, both the front and rear cover 92, 94 is in place during operation of the battery module 60.

FIG. 20 is a sectional end view through the battery module 60 and FIG. 21 is a perspective cutaway view of the battery module 60. FIGS. 20 and 21 show the cell stacks 110 contained within the module case 78 and show the module power buses 116 electrically connecting adjacent cell stacks 110. The cell stacks 110 are not tightly packed and the module 60 defines module common space 98. The module common space 98 is the interior volume of the module case 78 that is not occupied by the cell stacks 110 or by the other module components. The module common space 98 provides space through which heat transfer fluids 100, 102 may flow and provides an escape path for heated air, thermal decomposition products, and products of combustion in the event of an overheated cell 96 or cell fire, all as described below.

FIGS. 22 through 31 relate to the thermal management of the battery.

FIG. 22, along with FIGS. 7, 8, 23, and 28-31 illustrate a manifold 118 defined by the space between the port and starboard bulkheads 50, 52 of the battery frame 44. The manifold 118 allows the movement of liquid or gaseous heat transfer fluid 100, 102 through the battery 6 and through each of the battery modules 60, cooling or warming each of the battery cells 96 as needed.

FIG. 22 also shows one battery module 60 being installed in the battery by sliding the module 60 along the module longitudinal axis 70 and into engagement with the port bulkhead 50. When the module 60 is in engagement with the bulkhead 50, the inlet port 74 on the module inner end 66 is in fluid communication with the manifold 118 through the port bulkhead 50. While FIG. 22 shows four modules 60 engaging the port or starboard bulkhead 50, 52, multiple modules 60 may engage the port and starboard bulkheads 50, 52 and hence be in fluid communication with the manifold 118.

From FIGS. 23 through 29, the battery 6 is charged by a battery charging system that utilizes liquid heat transfer system 120 when the battery 6 is not attached to the aircraft 2. When the battery 6 is attached to the aircraft 2 and is discharging, as during flight, the battery 6 uses air as a gaseous heat transfer fluid 102.

FIG. 23 is a schematic diagram of charging system for the battery when the battery is removed from the aircraft 2. In addition to a source of electrical power 122 for charging and a charging battery management system 124 that controls all aspects of the charging operation, the charging system includes a liquid heat transfer system 120 to control the temperature of the battery cells 96 during charging.

From FIG. 23, the liquid heat transfer system 120 operates as follows during charging by the charging system. A pump 126 moves liquid heat transfer fluid 100 that is non-conducting and non-flammable through piping 128. The piping 128 conveys the liquid heat transfer fluid 100 to the manifold 118. The liquid heat transfer fluid 100 flows through the manifold 118 to the inlet port 74 of each battery module 60. The liquid heat transfer fluid 100 flows through the inlet port 74 and into the common space 98 in each module 60. The liquid heat transfer fluid 100 contacts each battery cell 96 directly, absorbing heat from each cell 96 or warming each cell 96, as required and under the control of the charging battery management system 124. The liquid heat transfer fluid 100 exits the module common space 98 through the exit port 76 on the outside surface 72 of the battery 6 and is collected by collection piping 130. The collection piping 130 conveys the heated liquid heat transfer fluid 100 to a heat exchanger 132 to adjust the temperature of the liquid heat transfer fluid 100, and from the heat exchanger 132 to the pump 126 for recirculation. The liquid heat transfer system 120 may include a surge tank 134, as shown by FIG. 29. The liquid heat transfer system 120 also may include heaters, such as resistance heaters, to warm the liquid heat transfer fluid 100 in the event that the cells 96 are too cold for optimal charging.

FIG. 24 is a detail section view of liquid heat transfer fluid 100 flow through the manifold 118 and inlet ports 74 and into the module common spaces 98 of each of the modules 60, and out the exit port 76. As shown by FIG. 24, the liquid heat transfer fluid 100 contacts each battery cell 96 within each battery module 60, controlling the temperature of each cell 96 under the control of the charging battery management system 124.

From FIGS. 23 and 24 the inlet port 74 of each battery module 60 is located at the lowest point on the module 60 when the battery 6 is being charged by the charging system. Fluid flow through the inlet port 74 is controlled by a float valve 136, shown by FIGS. 25 and 26. The float valve 136 is initially in the closed position, shown by FIG. 25, with the piston 140 of the float valve 136 sealing the valve seat 142. When the flow of liquid heat transfer fluid 100 begins during charging, the pressure of the liquid heat transfer fluid 100 within the manifold 118 pushes the piston 140 of the float valve 136 to the open position, shown by FIG. 26, and liquid heat transfer fluid 100 flows through the inlet port 74 and into the module common space 98. When liquid heat transfer fluid 100 is present in the module common space 98 at the inlet port 74, the buoyancy of the float 138 of the float valve 136 holds the piston 140 in the open position above the valve seat 142. When charging is complete, the pump 126 is shut off and liquid heat transfer fluid 100 drains out of the battery module 60 past the open float valve 136 and through the inlet port 74. Use of the float valve 136 requires that enough liquid heat transfer fluid 100 remain in the module common space 98 to keep the float valve 136 open to allow the liquid heat transfer fluid to drain.

As an alternative to the float valve 136, the valve may be actively controlled as the flap valve of FIGS. 27 and 28. FIG. 27 shows the flap valve 144 initially in the closed position. When liquid heat transfer fluid 100 is introduced to the manifold 118, the pressure of the liquid heat transfer fluid 100 opens the flap valve, allowing liquid heat transfer fluid 100 to enter the module common space 98. When charging is complete, the pump 126 is shut off and the actuator rod 146 is moved to the open position, holding the flap valve 144 in the open position. Liquid heat transfer fluid 100 then can drain from the module common space 98 through the inlet port 74.

As shown by FIG. 29, purge air 148 may be introduced to the exit port 76 of the liquid heat exchange system, pushing liquid heat transfer fluid 100 from the module common space 98 through the inlet port 74. Upon completion of charging, the pump 126 is shut down and valves 152 opened or closed to segregate the heat exchanger 132 and introduce a blower 150. The blower 150 pushes purge air 148 through the collection piping 130 and through the exit ports 76 of each battery module 60. The purge air 148 pushes the liquid heat transfer fluid 100 past the float valve 136 or flap valve 144 and through the inlet port 74. The liquid heat transfer fluid is collected in a surge tank 134 and the purge air 148 is recirculated through the blower 150.

From FIGS. 29 and 25-28, where the battery modules 60 incorporate the float valve 136 described above, the float valve 136 remains open while sufficient liquid heat transfer fluid 100 remains to support the buoyant float 138 so the piston 140 is separated from the valve seat 142. While the float valve 136 is open liquid heat transfer fluid 100 will flow from the battery module 60. When inadequate liquid heat transfer fluid 100 remains in the module common space 98 to support the float 138, the float valve 136 closes, blocking the inlet port 74. Where the battery module 60 utilizes an actively controlled valve such as the flap valve 144, the actuator rod 146 holds the flap valve 144 open during the purging process, allowing the liquid heat transfer fluid 100 to drain from the module common space 98.

FIG. 30 shows air 154 as a gaseous heat transfer fluid 102 when the battery 6 is discharging, as during flight. Air 154 is introduced to the manifold 118, as from a blower, fan or ram scoop under the control of the discharging battery management system. The discharging battery management system may adjust the speed of a blower, open or close ram air scoops, control heat provided by heaters, adjust the rate of discharge of the battery 6, and perform any other functions to safely control the battery 6 discharge. The pressure of the air 154 in the manifold will be higher than the pressure of the air 154 in the module common space 98, allowing the air 154 to lift the piston 140 of the float valve 136 into the open position. For a battery module 60 equipped with an active valve such as the flap valve 144, the air 154 also will lift the flap valve 144 to the open position. Air 154 will flow through the manifold 118, through the open valves 136, 144, through the module common space 98, around each of the battery cells 96, and through the exit port 76. The air 154, acting as the heat transfer fluid 102, cools the battery cells 96. The battery 6 may include heaters, such as resistance heaters, to warm the air 154 and hence warm the battery cells 96 if the cells 96 are too cold for optimal performance, all under the control of the discharging battery management system.

The flow of air 154 over the surface of the battery 6 also will contribute to air flow through the battery modules 60. Under the Bernoulli relation, air 154 moving across the outside surface 72 of the battery 60 will reduce the static air pressure normal to the surface 72, reducing the air pressure within the module common space 98.

FIG. 31 is a schematic drawing of the flow of heated air 154, decomposition products and products of combustion 156 in the event of a cell 96 fire during flight. The decomposition products and products of combustion 156 will mix with the cooling air 154 flow through the module common space 98 and be expelled through the exit port 76 to the outside of the battery 6 and aircraft 2. The module common space 98, cell insulation 112 and the separation between cell stacks 110 within the battery module 60 will impede damage to other cells 96 within the battery module 60. The module case 78 and the module inner end 66 and module outer end 68 will protect adjacent modules 60 from damage due to the fire and will prevent the spread of the fire to other modules 60. Pressurized cooling air 154 flow through the module inlet port 74 may prevent decomposition products and products of combustion 156 from escaping through the inlet port 74 into the manifold 118. In the event of a cell thermal runaway and prior to the onset of combustion, the rapid removal of decomposition gases, some of which may be flammable, from the cell 96 in the cooling air 154 flow, may be sufficient to prevent fire and prevent explosive damage within the battery module 60.

If, due to a cell fire or cell thermal runaway, the air pressure increases within the battery module 60 so that the air pressure in the module common space side 139 of the valve 136, 144 exceeds the air pressure on the manifold side 141 of the valve 136, 144, the float valve 136 or the flap valve 144 will close, blocking the flow of heated air 154, thermal decomposition products and products of combustion 156 into the manifold 118 The heated air 154, thermal decomposition products and products of combustion 156 flow through the module common space 98 to the exit port 76 and discharge to the outside of the battery 6.

In this document, common element numbers on different drawings have the same meaning, unless the context requires otherwise.

LIST OF NUMBERED ELEMENTS

The following is a list of numbered elements from the drawings and specification.

Electrically-powered aircraft 2
Fuselage 4
Electrical battery 6
Aircraft drive motor 8
Aircraft opening 10
Aircraft opening forward side 12
Aircraft opening aft side 14
Aircraft opening top side 16
Aircraft supports 18
Battery support 20
Hooks 22
Rings 24
Aircraft longitudinal axis 26
Battery forward side 28
Battery aft side 30
Battery top side 32
Battery ventral side 34
Forward battery structural connector 36
Aft battery structural connector 38
Forward aircraft structural connector 40
Aft aircraft structural connector 42
Battery frame 44
Power bus connectors 45
Access panel 46
Battery management system connectors 47
Ventral keel 48
Port bulkhead 50
Starboard bulkhead 52
Rotary lock 54
V-shaped opening 56
Bearings 58
Battery module 60
Shelf 64
Module inner end 66
Module outer end 68
Module longitudinal axis 70
Battery outside surface 72
Inlet port 74
Exit port 76
Module case 78
Case left side 80
Case right side 82
Case top side 84
Case bottom side 86
Interlocks 88
Cables or rods 90
Module front cover 92
Module back cover 94
Battery cells 96
Module common space 98
Liquid heat transfer fluid 100
Gaseous heat transfer fluid 102
Handle 104
Module power bus connectors 106
Module battery management system connector 108
Cell stack 110
cell insulator 112
cell stack frame 114
Module power bus 116
Manifold 118
Liquid heat transfer system 120
Source of electrical power 122
Charging battery management system 124

Pump 126
Piping 128
Collection piping 130
Heat exchanger 132
Surge tank 134
Float valve 136
Float 138
Module common space side 139
Piston 140
Manifold side 141
Valve seat 142
Flap valve 144
Actuator rod 146
Purge air 148
Blower 150
Valves 152
Air 154
Decomposition products and products of combustion 156

What is claimed is:

1. A battery system for an aircraft, the system comprising:
   a. an electrical battery configured to store electrical energy to provide motive power to the aircraft, the battery being operably attachable the aircraft, the battery being removable from the aircraft, the battery containing a plurality of battery cells, the battery cells being configured for an electrochemical storage of electricity, the battery defining a battery common space about the plurality of battery cells, the battery common space containing a gaseous heat transfer fluid in contact with each of the plurality of battery cells when the battery is operably attached to a fuselage of the aircraft and the battery is providing motive power to the aircraft;
   b. a charging system configured to charge the battery, the battery being operably attachable to the charging system when the battery is not attached to the aircraft, the battery common space containing a liquid heat transfer fluid in contact with each of the battery cells when the battery is attached to the charging system and the charging system is charging the battery.

2. A battery system for an aircraft, the system comprising:
   a. an electrical battery configured to store electrical energy to provide motive power to the aircraft, the battery being operably attachable the aircraft, the battery being removable from the aircraft, the battery containing a plurality of battery cells, the battery cells being configured for an electrochemical storage of electricity, the battery defining a battery common space about the plurality of battery cells, the battery common space containing a gaseous heat transfer fluid in contact with each of the plurality of battery cells when the battery is operably attached to a fuselage of the aircraft and the battery is providing motive power to the aircraft;
   b. a charging system configured to charge the battery, the battery being operably attachable to the charging system when the battery is not attached to the aircraft, the battery common space containing a liquid heat transfer fluid in contact with each of the battery cells when the battery is attached to the charging system and the charging system is charging the battery, wherein the charging system is not attached to the aircraft and is not configured to charge the battery when the battery is attached to the aircraft.

3. The battery system of claim 1 wherein the gaseous heat transfer fluid is air.

4. The battery system of claim 2 further comprising: a charging battery management system, the charging battery management system being configured to monitor the battery during charging and to control charging of the battery, the charging battery management system being operably attached to the charging system, the charging battery management system not being located on the aircraft.

5. The battery system of claim 2 wherein the charging system comprises: a liquid heat transfer system, the liquid heat transfer system having a configuration to circulate the liquid heat transfer fluid through the battery common space to add or remove heat from the battery cells and to circulate liquid heat transfer fluid through a heat exchanger to control the temperature of the liquid heat transfer fluid during charging of the battery, the liquid heat transfer system having a configuration to circulate the liquid heat transfer fluid from the heat exchanger to the battery common space.

6. The battery system of claim 5 wherein the battery comprises: a plurality of battery modules, each battery module defining a module interior volume, each module interior volume defining a module common space, each of the battery modules containing a plurality of the battery cells within the module common space, the module common space of the plurality of battery modules in combination defining the battery common space, each of the battery modules defining an inlet port and an outlet port in fluid communication with the module common space, the configuration of the liquid heat transfer system to circulate liquid heat transfer fluid through the battery common space comprising: the liquid heat transfer system being configured to circulate liquid heat transfer fluid through the inlet port, through the module common space, and through the outlet port of each battery module.

7. The battery system of claim 6 wherein the configuration of the liquid heat transfer system to circulate liquid heat transfer fluid from the heat exchanger to the battery common space comprises: a manifold, the manifold being contained within the battery, the manifold being configured to receive the liquid heat transfer fluid from the heat exchanger, the manifold being in fluid communication with the inlet port of each of the battery modules.

8. The battery system of claim 7 wherein each of the battery modules has a configuration to contain an air in the module common space when liquid heat transfer fluid is not present in the module common space, each of the battery modules further comprising: a valve, the valve having a configuration to prevent flow of the air from the module common space to the manifold in the event that thermal runaway or fire in a battery cell within the battery module causes an increase in a pressure of the air within the module common space in excess of the pressure of the air within the manifold when liquid heat transfer fluid is not present in the module common space.

9. The battery system of claim 8 wherein the configuration of the valve is that the valve is a float valve having a module common space side and a manifold side, the float valve defining a valve seat, a piston, and a float, the valve seat being disposed on the manifold side of the valve, the piston being disposed on the module common space side of the valve and configured to engage and block the valve seat, the float being operably attached to the piston on the module common space side of the valve so that the float will move the piston to an open position when liquid heat transfer fluid is present in the module common space at the inlet port and that will move to a closed position when liquid heat transfer fluid is not present in the module common space at the inlet port, and so that the pressure of the air or the liquid heat transfer fluid within the manifold that is greater than the pressure within the module common space will move the piston from the closed position to the open position.

10. The battery system of claim 4 wherein the battery comprises:
   a. a frame, the frame being attachable to and removable from the aircraft;
   b. a plurality of battery modules, each of the battery modules containing a plurality of the battery cells, each battery module being attachable to and removable from the frame when the frame is attached to the aircraft, each battery module being attachable to and removable from the frame when the frame is removed from the aircraft;
   c. a power bus connected to the frame and operably connected to an aircraft drive motor when the frame is attached to aircraft, each of the battery modules being operably connected to the power bus when the battery module is attached to the frame.

11. The battery system of claim 10 wherein the frame comprises: a battery management system bus, the battery management system bus being operably connected to a discharge battery management system, the discharge battery management system being configured to monitor the battery and to control the discharge of the cells when the frame is attached to the aircraft, each battery module being operably attached to the discharge battery management system bus when the battery module is attached to the frame, the discharge battery management system being located within the battery or the aircraft.

12. The battery system of claim 10 where each of the plurality of battery modules is interchangeable with each other of the plurality of battery modules.

13. The battery system of claim 10 where the frame has a maximum number of battery modules that are attachable to and removable from the frame, the frame being configured to accommodate a number of battery modules that is less than or equal to the maximum number of battery modules.

14. A battery system for an aircraft, the system comprising:
   a. an electrical battery configured to store electrical energy to provide motive power to the aircraft, the battery being operably attachable the aircraft, the battery being removable from the aircraft, the battery containing a plurality of battery cells, the battery cells being configured for an electrochemical storage of electricity, the battery defining a battery common space about the plurality of battery cells, the battery common space containing a gaseous heat transfer fluid in contact with each of the plurality of battery cells when the battery is operably attached to a fuselage of the aircraft and the battery is providing motive power to the aircraft;
   b. a charging system configured to charge the battery, the battery being operably attachable to the charging system when the battery is not attached to the aircraft, the battery common space containing a liquid heat transfer fluid in contact with each of the battery cells when the battery is attached to the charging system and the charging system is charging the battery wherein the battery comprises:
   (i) a frame, the frame being attachable to and detachable from the aircraft to attach and detach the battery to and from the aircraft, the battery having a ventral side, the frame defining a ventral keel on the ventral side of the battery, the ventral keel being coincident with a vertical mathematical plane passing through a longitudinal axis of the fuselage when the battery is attached to the aircraft;
   ii. a port bulkhead and a starboard bulkhead that are attached to the frame and ventral keel, the port and starboard bulkheads being disposed in a spaced apart relation on opposing sides of the ventral keel, the port and starboard bulkheads being generally planar and parallel to the vertical mathematical plane when the battery is attached to the aircraft.

15. The battery system of claim 14, the battery system further comprising:
   a. the fuselage defining an opening, the opening having an opening forward end and an opening aft end;
   b. mating connectors configured to attach the forward end of the ventral keel to the forward end of the opening and to attach the aft end of the ventral keel to the aft end of the opening, the mating connectors having a configuration to transfer a tension and a compression structural load from the forward and aft ends of the opening to the ventral keel and from the ventral keel to the forward and aft ends of the opening, the mating connectors and ventral keel being configured so that the stiffness of the combination of the aircraft and the battery in flexure in a vertical plane coincident with the ventral keel and the longitudinal axis of the aircraft is greater than the stiffness in flexure of the aircraft in the vertical plane when the battery is not attached.

16. The battery system of claim 14, the battery system further comprising:
   a. a plurality of battery modules, each of the battery modules containing a plurality of the cells;
   b. a plurality of shelves defined by the frame, each of the battery modules being configured to slideably engage each one of the plurality of shelves, each of the battery modules defining an inner end and an opposing outer end, the inner end of each battery module defining an inlet port, the port and starboard bulkhead defining a manifold thereinbetween, the inlet port being in fluid communication with the manifold when the battery module slidable engages a one of the plurality of shelves;
   c. each of the battery modules having a module power bus connector and a module battery management system connector, each battery module power bus connector engaging a battery power bus and each module battery management connector engaging a battery management bus when the battery module slideably engages the one of the plurality of shelves.

17. The battery system of claim 16 wherein the outer end of the battery module defines an outlet port, the outer end of the battery module being disposed proximal to an outside surface of the battery when the battery module slideably engages the one of the plurality of shelves and wherein the outlet port communicates to the outside surface of the battery when the battery module is slideably engaged with the one of the shelves.

18. The battery system of claim 14, the system further comprising:
   a. a plurality of battery modules configured for selectable engagement with the frame, each of the battery modules defining an inner end, an outer end, a left side, a right side, a top side and a bottom side;
   b. each battery module defining a module common space, each of the inner ends of each of the battery modules defining an inlet port in fluid communication with the module common space, the port and starboard bulkheads defining a manifold thereinbetween, each inlet port being configured for fluid communication through the port or the starboard bulkhead with the manifold when the module is in engagement with the frame;

c. one or more interlocks defined by each of the left, right, top, and bottom sides of each of the battery modules that engage corresponding interlocks of adjacent battery modules when the battery modules are in engagement with the frame and that are configured to constrain relative motion of the adjacent battery modules.

19. The battery system of claim 18 wherein the interlocks defined by each of the battery modules consist of a plurality of mating bosses, blocks, pins, slots, channels, grooves or openings.

20. The battery system of claim 15 wherein a flight load and a crash load standard applies to the aircraft, the aircraft being configured to meet the flight load and crash load standards when the battery is attached to the fuselage of the aircraft, the aircraft not meeting the flight load or crash load standards applicable to the aircraft when the battery is not attached to the aircraft.

* * * * *